US008433345B2

(12) United States Patent
Li et al.

(10) Patent No.: US 8,433,345 B2
(45) Date of Patent: Apr. 30, 2013

(54) METHODS AND APPARATUS TO SUPPORT PAGING WITH LESS INTERFERENCE IN MULTI-TIER COMMUNICATION SYSTEMS

(75) Inventors: Ying Li, Garland, TX (US); Zhouyue Pi, Allen, TX (US); Baowei Ji, Plano, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 402 days.

(21) Appl. No.: 12/814,068

(22) Filed: Jun. 11, 2010

(65) Prior Publication Data

US 2010/0323610 A1 Dec. 23, 2010

Related U.S. Application Data

(60) Provisional application No. 61/268,859, filed on Jun. 17, 2009, provisional application No. 61/273,187, filed on Jul. 31, 2009.

(51) Int. Cl.
*H04W 68/00* (2009.01)
*H04B 7/00* (2006.01)

(52) U.S. Cl.
USPC .......................................... 455/458; 455/515

(58) Field of Classification Search .................. 455/458, 455/515
See application file for complete search history.

(56) References Cited

U.S. PATENT DOCUMENTS

| 2002/0090960 | A1 | 7/2002 | Laroia et al. |
| 2005/0186973 | A1 | 8/2005 | Gaal et al. |
| 2007/0140207 | A1 | 6/2007 | Narushima |
| 2010/0220621 | A1* | 9/2010 | Li et al. ............ 370/252 |
| 2010/0304743 | A1* | 12/2010 | Jung et al. ........ 455/434 |
| 2012/0157131 | A1* | 6/2012 | Chang et al. ..... 455/458 |

FOREIGN PATENT DOCUMENTS

WO  WO 2006/094295 A1  9/2006

OTHER PUBLICATIONS

International Search Report dated Dec. 30, 2010 in connection with International Patent Application No. PCT/KR2010/003911.
Written Opinion of the International Searching Authority dated Dec. 30, 2010 in connection with International Patent Application No. PCT/KR2010/003911.

\* cited by examiner

*Primary Examiner* — Marisol Figueroa

(57) ABSTRACT

A first base station and mobile station are capable of mitigating interference resulting from communications from a second base station. The base station can determine if at least a portion of a paging slot overlaps with an available interval (AI) of the second base station in which the second base station transmits. The first base station adjusts an occurrence of the paging slot such that the paging slot overlaps and/or occurs within an unavailable interval (UAI) of the second base station wherein the base station does not transmit or transmits with limited resources.

The mobile station also can determine if at least a portion of a listening slot overlaps with the AI and, using the same procedure that the first base station uses to recalculate the paging slot, recalculates the listening slot such that the listening slot overlaps and/or occurs within the UAI of the LDC mode.

20 Claims, 16 Drawing Sheets

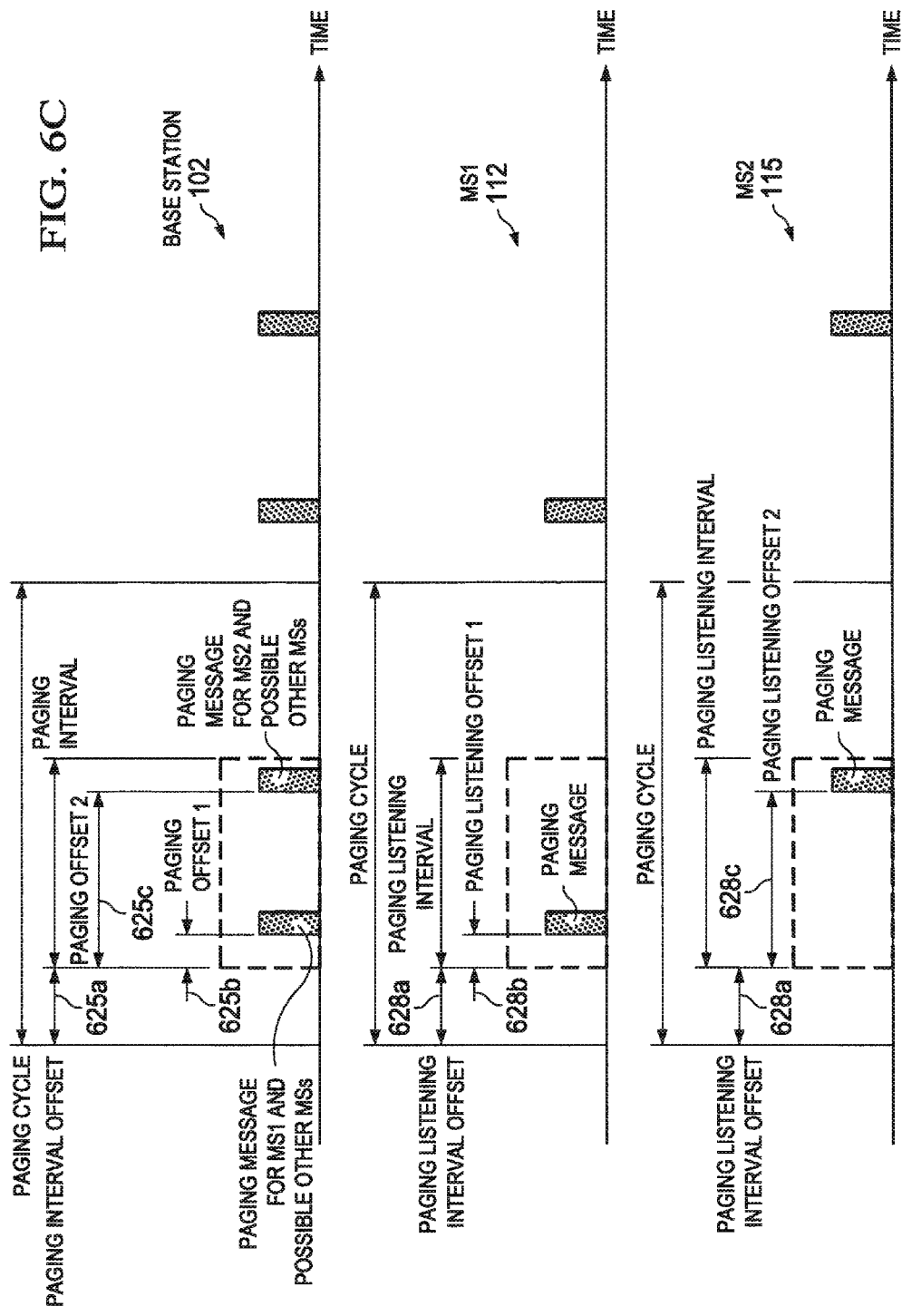

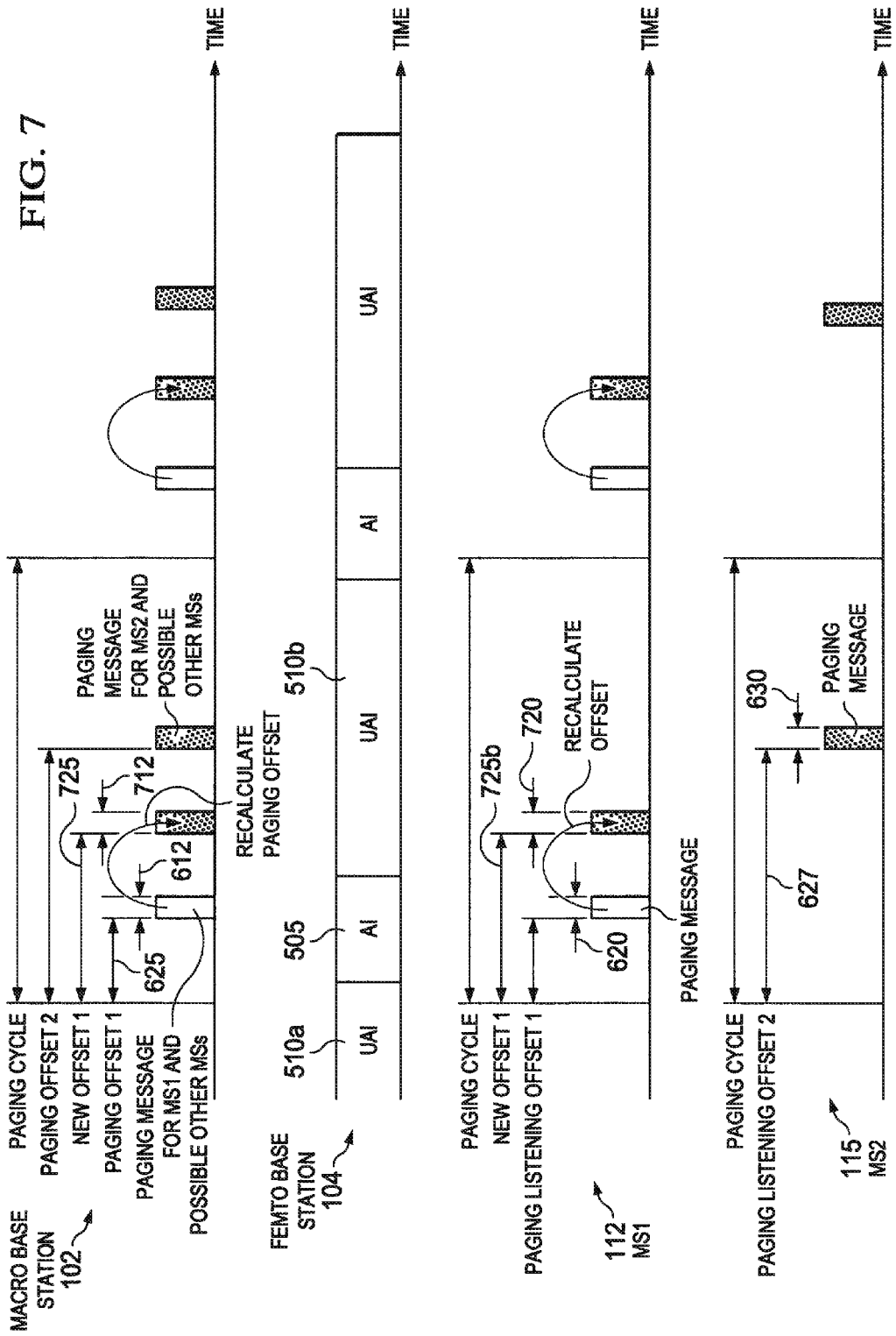

METHODS AND APPARATUS TO SUPPORT PAGING WITH LESS INTERFERENCE IN MULTI-TIER COMMUNICATION SYSTEMS

CROSS-REFERENCE TO RELATED APPLICATION(S) AND CLAIM OF PRIORITY

The present application is related to U.S. Provisional Patent Application No. 61/268,859, filed Jun. 17, 2009, entitled "METHODS AND APPARATUS TO SUPPORT PAGING WITH LESS INTERFERENCE IN COMMUNICATION SYSTEMS WITH FEMTOCELLS". The present application is also related to U.S. Provisional Patent Application No. 61/273,187, filed Jul. 31, 2009, entitled "METHODS AND APPARATUS TO SUPPORT FEMTOCELL LOW DUTY MODE AND INTERFERENCE MITIGATION". Provisional Patent Application Nos. 61/268,859 and 61/273,187 are assigned to the assignee of the present application and is hereby incorporated by reference into the present application as if fully set forth herein. The present application hereby claims priority under 35 U.S.C. §119(e) to U.S. Provisional Patent Application Nos. 61/268,859 and 61/273,187.

TECHNICAL FIELD OF THE INVENTION

The present application relates generally to mobile communication devices and, more specifically, to paging with less interference in multi-tier communications systems that include different types and sizes of the base stations such as macro, pico, femto base stations, and the like.

BACKGROUND OF THE INVENTION

The demand of wireless data traffic is explosively increasing. To meet such demand, the cellular systems are evolving into multi-tier networks with base stations with diverse sizes, types, use cases, and so forth. To have more and multi-tier base stations, such as femtocells, picocells, relay, and the like, in cellular system gains the momentum in wireless networks. Small-sized low-power base stations, such as picocell, femtocell, and the like, become heated topics, because of their potential advantages of low cost, offloading the traffic from macrocells, providing large amount of wireless data traffic to mobile stations, and the like.

Femtocell devices are small base stations designed for home or small business use. Femtocell devices operate in a small range and are designed to provide cellular coverage in the home or office. The typical femtocell device connects to a Security Gateway or Softswitch over an Interent Protocol (IP) connection, such as a Digital Subscriber Line (DSL) or broadband cable connection. The Security Gateway or Softswitch is intended to plug into the DSL or cable modem using a standard Ethernet cable.

Femto Base Stations (FBSs) can be open or closed. An open FBS accepts any compatible mobile device (e.g., accepts communications to and from any compatible cell phone, PDA, and the like). A closed FBS requires that the mobile device be authorized to access through the FBS.

SUMMARY OF THE INVENTION

A first base station capable of delivering a paging message is provided. The paging message is broadcast in a paging slot to at least one of a plurality of mobile stations. The base station can determine if at least a portion of the paging slot overlaps with an available interval (AI) of a second base station in which the second base station transmits. The base station further can adjust an occurrence of the paging slot such that the paging slot overlaps and/or occurs within an unavailable interval (UAI) of the LDC mode.

A method for delivering a paging message, in a paging slot, to at least one of a plurality of mobile stations, is provided. The method includes obtaining the patterns of the occurrence of an available interval (AI) of at least one base station in which the at least one base station transmits, and an unavailable interval (UAI) of the at least one base station in which the at least one base station transmits over limited resources or does not transmit. The method also includes comparing the paging slot to the patterns of the occurrence of AI and/or UAI of the base station. If it is determined that at least a portion of the paging slot overlaps with an available interval (AI) of the base station, an occurrence of the paging slot is adjusted such that the paging slot overlaps and/or occurs within an UAI of the base station.

A mobile station capable of receiving a paging message is provided. The mobile station includes a plurality of antennas configured to receive the paging message, in a paging listening slot, from at least one base station. The mobile station also includes a main processor coupled to the antennas. The main processor can determine if at least a portion of the paging listening slot overlaps with an available interval (AI) of a second base station in which the second base station transmits. The main processor also can adjust an occurrence of the paging listening slot such that the paging listening slot overlaps and/or occurs within an unavailable interval (UAI) of the second base station in which the base station transmits over limited resources or does not transmit.

A method for receiving a paging message in a listening slot is provided. The method includes obtaining the patterns of the occurrence of an available interval (AI) of at least one base station in which the at least one base station transmits, and an unavailable interval (UAI) of the at least one base station in which the at least one base station transmits over limited resources or does not transmit. The method also includes receiving paging slot information from a serving base station. The paging slot information is configured to identify the occurrence of a paging slot such that the listening slot can be calculated. The method further includes comparing the paging slot to the patterns of the occurrence of the at least one of the AI and UAI of the at least one base station; determining if at least a portion of the paging slot overlaps with the AI of the at least one base station; and adjusting an occurrence of the paging slot such that the paging slot at least one of overlaps and occurs within an UAI of the at least one base station.

A base station capable of broadcasting a paging message is provided. The paging message is broadcast in a paging slot to at least one of a plurality of mobile stations. The base station can operate in a low duty cycle (LDC) mode. The LDC mode includes an available interval (AI) and an unavailable interval (UAI). The base station can transmit and receive in the AI and is configured to not transmit or transmit with limited resources during the UAI. The base station can determine if at least a portion of the paging slot overlaps with the UAI and adjust an occurrence of the paging slot such that the paging slot overlaps and/or occurs within the AI.

A method for broadcasting a paging message, in a paging slot, to at least one of a plurality of mobile stations, is provided. The method includes operating a base station in a low duty cycle (LDC) mode. The LDC mode includes an available interval (AI) and an unavailable interval (UAI). The base station can transmit and receive in the AI and is configured to not transmit or transmit with limited resources during the UAI. The method also includes comparing the paging slot to a LDC mode pattern for the base station; determining if at least a portion of the paging slot overlaps with the UAI; and adjusting an occurrence of the paging slot such that the paging slot overlaps and/or occurs within the AI.

A mobile station capable of receiving a paging message is provided. The mobile station includes a plurality of antennas configured to receive the paging message, in a listening slot, from a base station. The mobile station also includes a main processor coupled to the antennas. The main processor can determine if at least a portion of the paging listening slot overlaps with an unavailable interval (UAI) of a low duty cycle (LDC) mode of the base station. The main processor adjusts an occurrence of the paging listening slot such that the paging listening slot overlaps and/or occurs within an available interval (AI) of the LDC mode.

A method for receiving a paging message in a listening slot is provided. The method includes obtaining a low duty cycle (LDC) mode pattern for a base station operating in an LDC mode. The LDC mode includes an available interval (AI) and an unavailable interval (UAI). The base station can transmit and receive in the AI and is configured to not transmit or transmit with limited resources during the UAI. The method also includes determining if at least a portion of a paging slot overlaps with the UAI of the LDC mode; and recalculating an occurrence of the listening slot such that the listening slot overlaps and/or occurs within the AI of the LDC mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A through 6C illustrate a process for paging mobile stations in idle mode according to the present disclosure;

FIG. 7 illustrates a process for paging in an unavailable interval according to embodiments of the present disclosure;

DETAILED DESCRIPTION OF THE INVENTION

Figure 1:
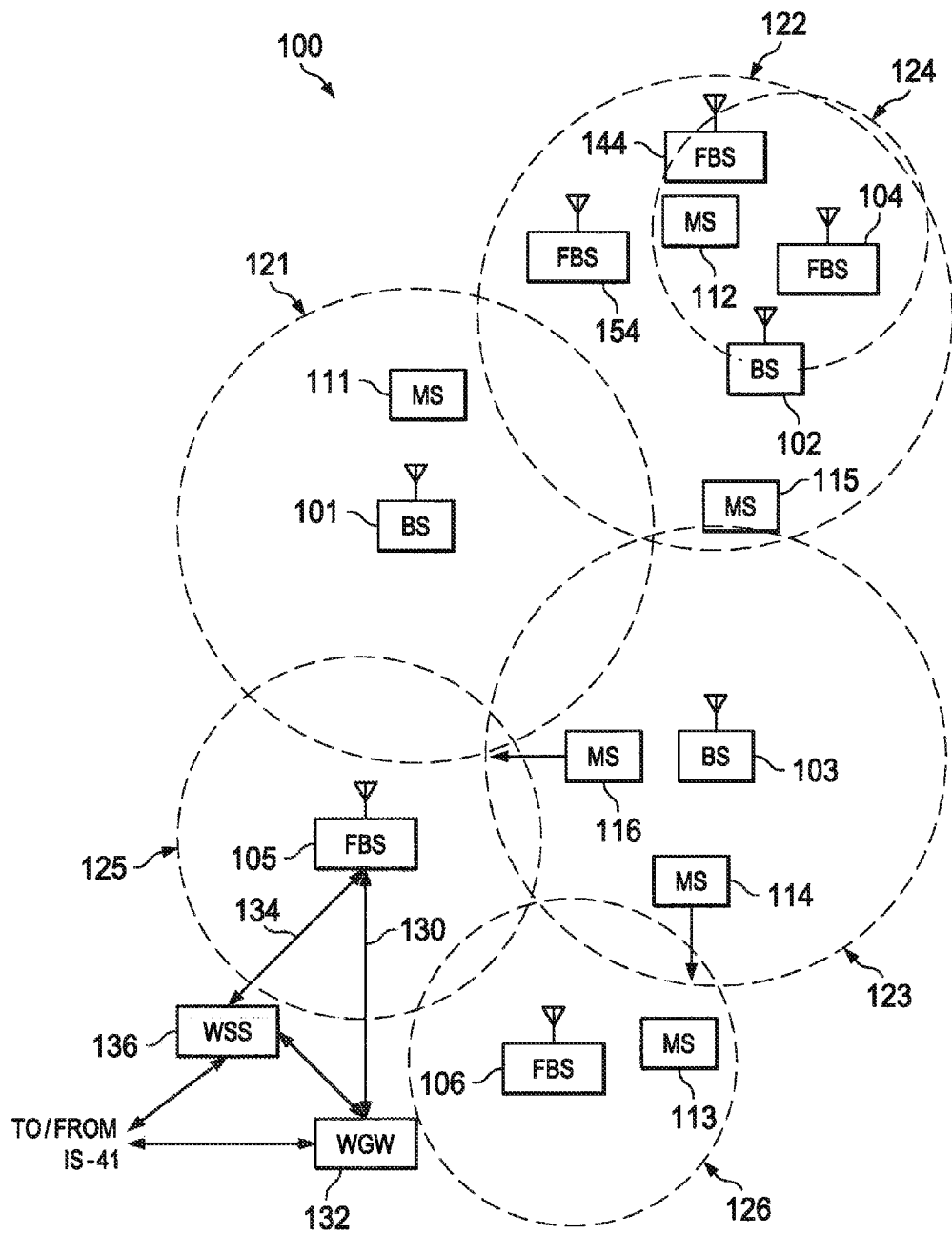
FIG. 1 illustrates exemplary wireless network 100 according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

As described in IEEE 802.16m System Requirements, a Femtocell is a low power Base Station (BS). Femtocells are typically installed by a subscriber in a home or small office/home office to provide access to closed or open group of users as configured by the subscriber and/or the access provider. Femtocell BS's typically operate in licensed spectrum and may use the same or different frequency as macro-cells and use broadband connection such as cable or DSL for backhaul. The mobile station (MS)'s using access in a femtocell are typically stationary or moving at low (i.e., pedestrian) speed.

The present application is to support the coexistence of small-sized low-power base stations and larger base stations such as macro, which may overlay the low-power small-sized base stations. Throughout the application, femtocell is used as an example of the low-power small-sized base stations, and macrocell is used as an example of the large-sized base stations which may overlay the smaller base stations. All the embodiments are applicable to any type or size of the base stations in multi-tier networks, where some larger cell may overlay some smaller cells.

Low-power small-sized cells, such as femtocells, are different from larger cells, such as macro cells. The multi-tier network, with base stations of various types and sizes, may have the capability to identify femto base stations as well as to distinguish femtocells from macro cells. Further, the multi-tier network may have the capability to distinguish open-access femtocell (which allow any compatible MS to access) from the Closed Subscriber Group (CSG) femtocell (which allows only authorized MS's, i.e., the MS's belonging to this femtocell, to access), since some operations, such as, but not limited to, handover, paging, and the like, will be different for femtocells and macro cells, and for open-access and CSG femtocells. For example, the MS with high speed may not need to handover to any femtocells, the open-access femto base stations may accept the handover requests from MS while the MS that does not belong to a CSG femtocell may not need to send handover request to that femtocell, and so forth. When there is no mobile station in its cell (that is, coverage area), the femto base station may enter a low duty cycle (LDC) mode, which has a limited active frequency, time, or both. The LDC mode can be referenced differently in various examples such as a power saving mode and the like.

The LDC mode is a new attribute for base stations. LDC mode is may not be needed for macrocells because, as discussed in IEEE 802.16, Rev2_D9a, March 2009, the contents of which are hereby incorporated by reference, it is very rare that a macrocell does not have any active or prospective user within its coverage. In addition, the macrocell may include the LDC mode in the future as well, such as during a nighttime in the area where there may be no or very few residences. However, a smaller sized base station, such as a femto BS, can have no active user in its coverage, such as a home femto after the residence leaves home without any active session setup. In this example, the LDC mode can reduce power consumption of the femto BS and can reduce the interference the femto BS generates to macrocells.

The embodiments of the present disclosure are not limited to femtocells, although femtocells are illustrated as examples of the low-power, small-sized cells. Other low-power small-sized cells can include picocells, hot zone cells, small relay cells, and the like. In addition, the embodiments are not limited to the macrocells, although macrocells are illustrated as examples of the larger cells that can cover or overlay the smaller cells within the coverage are of the large cell. The embodiments can be used with any type or sized base station with some level of accessibility differentiation such as open to all mobile stations (e.g., open BS), or open to limited/authorized/subscribed mobile stations (e.g., CSG BS), or open to all mobile station but with limited/authorized/subscribed mobile stations having higher priority and other mobile stations having lower priority (e.g., hybrid BS), and so forth. The concept of the CSG is not limited to femtocells only, but also can be applicable to other BSs, such as microcells, picocells, relays, and the like.

The femtocell base station is configured to inform a mobile station regarding an identification of CSG with the CSG ID. Therefore, even if the MS knows the femtocell is of a CSG type, the MS also is informed whether this femtocell is closed for or authorized for the MS to access, i.e., the MS knows whether the MS can access this CSG or not. The MS can be configured to store a list (such as a white-list) of the CSG femtocells that the MS can access. As such when the MS receives the CSG ID of a CSG femtocell, the MS checks the received CSG ID with the list of the accessible femtocells. If the received CSG ID is in the list of the MS's list of accessible femtocells, the MS knows the CSG is accessible. Hence, a CSG ID of the CSG femtocell is sent to MS's via wireless communication signaling. To make the list of accessible CSG femtocells of a MS short, multiple CSG femtocells share a common CSG ID if these CSG femtocells have the same set of MS's allowed to access them. For example, if a user subscribes via a chain of coffee shops to access the closed femtocells at each coffee shop, the CSG femtocells for the coffee shops will share the common CSG ID.

In some examples, different groups of preambles are used to distinguish femtocells from macro cells. The preambles are divided into two groups, one for femtocells, and another for macro cells. In the case of a large number of femtocells and insufficient preambles, the preambles are dynamically allocated. In some examples, one bit in least significant bit (LSB) that is a 24 programmable bit segment of the base station ID is used to distinguish femtocell and macro cell, and to use another bit in LSB to distinguish femtocell open-access mode and CSG mode. This approach will increase the overhead of Broadcast Channel (BCH), which is very expensive. In additional and alternative examples, different scrambling sequences and/or different CRCs (cyclic redundancy check) to differentiate femto BS from macro BS's, and to differentiate open-access femto BS and CSG femto BS.

FIG. 1 illustrates exemplary wireless network 100 according to embodiments of the present disclosure. The embodiment of wireless network 100 illustrated in FIG. 1 is for illustration only. Other embodiments of the wireless network 100 could be used without departing from the scope of this disclosure.

Wireless network 100 comprises a plurality of cells 121-126, each containing one of the Base Stations (BS), BS 101, BS 102, or BS 103 or Femto Base Stations (FBS), FBS 104, FBS 105 or FBS 106. Base stations 101-103 can be larger sizes, while base stations 104-106 can be small sizes. Base stations 101-106 communicate with a plurality of mobile stations (MS) 111-116 over code division multiple access (CDMA) channels), Orthogonal Frequency Division Multiple Access (OFDMA), or any other communications standard as is known in the art. In some embodiments, mobile stations 111-116 are capable of receiving data traffic and/or voice traffic on two or more CDMA channels simultaneously. Mobile stations 111-116 may be any suitable wireless devices (e.g., conventional cell phones, PCS handsets, personal digital assistant (PDA) handsets, portable computers, telemetry devices) that are capable of communicating with base stations 101-106 via wireless links.

Dotted lines show the approximate boundaries of cells 121-123 in which base stations 101-103 are located. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122, 123 and the base station controller associated with each base transceiver subsystem are collectively represented by BS 101, BS 102, and BS 103, respectively.

In some embodiments, BS 101, BS 102 and BS 103 transfer voice and data signals between each other and the public switched telephone network (PSTN) (not shown), or any IS-41 communication network as is known in the art, via communication line (not shown) and mobile switching center (MSC) (not shown). The communication line may be any suitable connection means, including a T1 line, a T3 line, a fiber optic link, a network packet data backbone connection, or any other type of data connection. The communication line links each vocoder in the BSC with switch elements in the MSC. The connections on communication line may transmit analog voice signals or digital voice signals in pulse code modulated (PCM) format, Internet Protocol (IP) format, asynchronous transfer mode (ATM) format, or the like.

The MSC is a switching device that provides services and coordination between the subscribers in a wireless network and external networks, such as the IS-41, PSTN, or Internet. The MSC is well known to those skilled in the art. In some embodiments of the present disclosure, communications line may be several different data links where each data link couples one of BS 101, BS 102, or BS 103 to the MSC.

The wireless network 100 includes a femto-cell base station 124-126. Each FBS 124-126 includes components analogous to those found in macro base stations BS 101, BS 102 and BS 103. As such, FBS 124, FBS 125 and FBS 126 each comprises a femto base station controller (FBSC) and one or more femto base transceiver subsystem(s) (FBTS). Each of FBS 124, FBS 125 and FBS 126 communicates with mobile stations in its served area using wireless fidelity, IS-95, CDMA or any other cellular communications standard.

Voice and data signals are transferred between the FBS 104, FBS 105 and FBS 106 and the IS-41 network (e.g., PSTN) via communications lines, wireless gateway and wireless soft switches. For example, Voice signals are transferred between the FBS 105 and the IS-41 network via communication line 130, Wireless Gateway (WGW) 132. Data signals are transferred between the FBS 105 and the IS-41 network via communication line 134 and Wireless Soft Switch (WSS) 136. The WGW 132 and WSS 136 are coupled via a backhaul connection (not shown), e.g., the IS-41, to the MSC. The WGW 132 provides a bearer path between FBS 105 and the MSC via the IS-41. The WSS 136 provides a signaling path FBS 105 and WGW 132 as well as to the MSC via the IS-41.

A dotted line shows the approximate boundaries of cells 124-126 in which FBS 104, FBS 105 and FBS 106 are located. The cell is shown approximately circular for the purposes of illustration and explanation only. It should be clearly understood that the cell may have an irregular shape, depending on the cell configuration selected and natural and man-made obstructions.

In the exemplary wireless network 100, MS 111 is located in cell 121 and is in communication with BS 101. MS 112 is located in cell 121 and cell 124 and is in communication with BS 102. MS 113 is located in cell 126, is in communication with FBS 106. MS 114 is located in cell 123, is in communication with BS 103 and is moving in the direction of cell 126, as indicated by the direction arrow proximate MS 114. At some point, as MS 114 moves into cell 126 and MS 114 will detect signals from FBS 106. MS 115 is located in cell 122 and is in communication with BS 102. MS 115 also is located close to the edge of cell 123. MS 116 is located in cell 123, is in communication with BS 103 and is moving in the direction of cell 121 and cell 125. At some point, as MS 116 moves into area covered by cell 121 and cell 125, MS 116 will detect signals from BS 101 and FBS 105 and a handoff will occur.

The handoff procedure transfers control of a call from a first cell to a second cell. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

As shown in FIG. 1, MS 112 is located in both cell 122 and cell 124. FBS 104 is a CSG FBS. Furthermore, MS 112 has not subscribed to FBS 104. Therefore, MS 112 is not authorized to access FBS 104. Accordingly, MS 112 is not in communication with FBS 104 and is only in communication with BS 102.

Additionally, MS 114 is moving from BS 103 towards FBS 106. FBS 106 is an open-access FBS. As MS 114 enters cell 126, MS 114 becomes aware of FBS 106 as MS 114 receives signaling from FBS 106. The signaling contains a base station identifier (e.g., base station identity, or some other value) for FBS 106 indicating that FBS 106 is an open FAP. Since FBS 106 is an open FAP, all compatible wireless devices, including MS 114, are authorized to access FBS 106. In some embodiments, a handoff occurs wherein communications between MS 114 and BS 103 are terminated and communications between MS 114 and FBS 106 are established. MS 114 may still be located within cell 123 and in communication with FBS 104.

Furthermore, MS 116 is moving from BS 103 towards FBS 105. FBS 105 is a closed FBS. Therefore, only authorized wireless devices are allowed to access FBS 105. For example, FBS 105 may be located in a Starbucks® and only individuals who have subscribed for access a FBS through Starbucks® are allowed to access FBS 105. A subscriber with MS 116 enters cell 125. MS 116 receives signaling from FBS 105. The signaling includes a Closed Subscriber Group (CSG) Identification (ID) for FBS 105. MS 116 recognizes the CSG ID for FBS 105 and a handoff of MS 116 from BS 103 to FBS 105 occurs.

Figure 2:
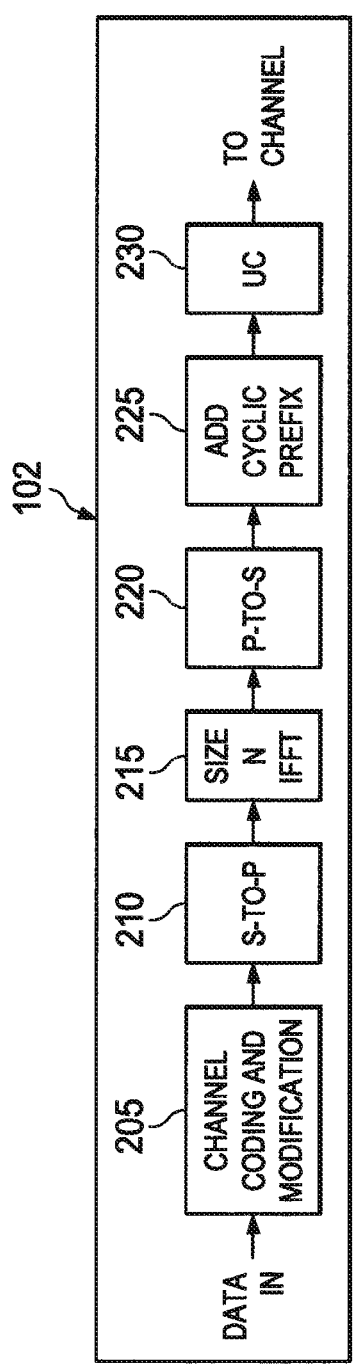
FIG. 2 is a high-level diagram of an OFDMA transmitter according to embodiments of the present disclosure.
Figure 3:
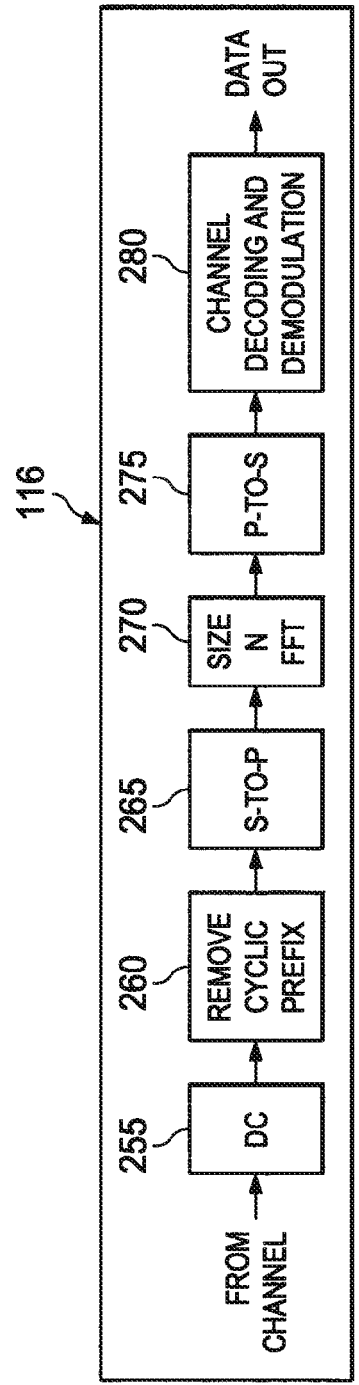
FIG. 3 is a high-level diagram of an OFDMA receiver according to embodiments of the present disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 or femto base station (FBS) 104 and the OFDMA receive path is implemented in mobile station (MS) 112 for the purposes of illustration and explanation only. However, it will be understood by those skilled in the art that the OFDMA receive path may also be implemented in BS 102 and/or FBS 104 and the OFDMA transmit path may be implemented in MS 112.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in MS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-106 may implement a transmit path that is analogous to transmitting in the downlink to mobile stations 111-116 and may implement a receive path that is analogous to receiving in the uplink from mobile stations 111-116. Similarly, each one of mobile stations 111-116 may implement a transmit path corresponding to the architecture for transmitting in the uplink to base stations 101-106 and may implement a receive path corresponding to the architecture for receiving in the downlink from base stations 101-106.

Figure 4:
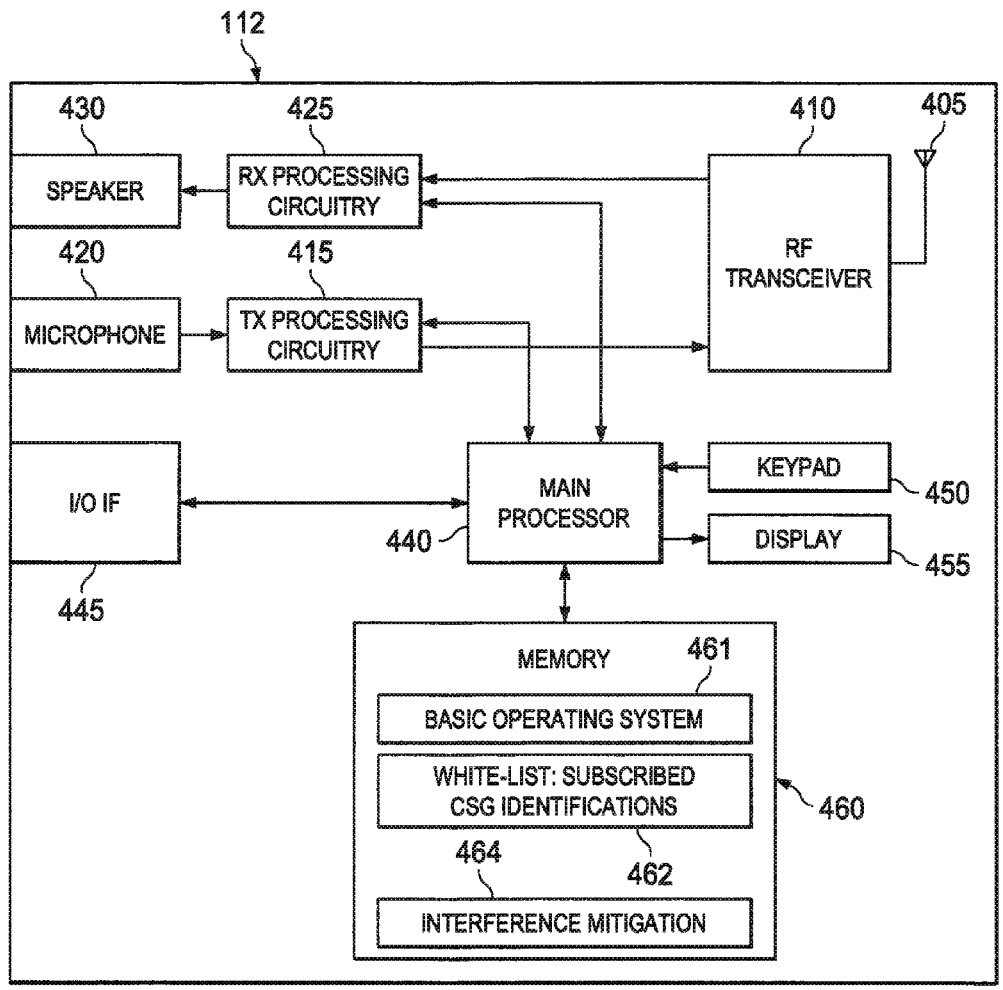
FIG. 4 illustrates wireless mobile station according to embodiments of the present disclosure.

FIG. 4 illustrates wireless mobile station 112 according to embodiments of the present disclosure. The embodiment of wireless mobile station 112 illustrated in FIG. 4 is for illustration only. Other embodiments of the wireless mobile station 112 could be used without departing from the scope of this disclosure. It will be understood that although MS 112 is described for illustration and example only, descriptions can apply to MS 112-116 equally.

Wireless mobile station 112 includes antenna 405, radio frequency (RF) transceiver 410, transmit (TX) processing circuitry 415, microphone 420, and receive (RX) processing circuitry 425. MS 112 also includes speaker 430, main processor 440, input/output (I/O) interface (IF) 445, keypad 450, display 455, and memory 460. Memory 460 further includes basic operating system (OS) program 461, a white-list including a plurality of CSG IDs 462, and instructions for interference mitigation 464 that can include functions or algorithms for changing a paging listening interval and/or a paging listening slot.

Radio frequency (RF) transceiver 410 receives from antenna 405 an incoming RF signal transmitted by a base station (e.g., either a base station or femto base station) of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. According to some embodiments, part of memory 460 comprises a random access memory (RAM) and another part of memory 460 comprises a Flash memory, which acts as a read-only memory (ROM).

Main processor 440 executes basic operating system (OS) program 461 stored in memory 460 in order to control the overall operation of wireless mobile station 112. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 340 can move data into or out of memory 460, as required by an executing process. Main processor 440 is also coupled to I/O interface 445. I/O interface 445 provides mobile station 112 with the ability to connect to other devices such as laptop computers and handheld computers. I/O interface 445 is the communication path between these accessories and main controller 440.

Main processor 440 is also coupled to keypad 450 and display unit 455. The operator of mobile station 112 uses keypad 450 to enter data into mobile station 112. Display 455 may be a liquid crystal display capable of rendering text and/or at least limited graphics from web sites. Alternate embodiments may use other types of displays.

Main processor 440 is configured to store one or more CSG IDs 462 for use in accessing closed FAPs. When a user (e.g., subscriber) subscribes to a FAP service, the user is provided with one or more CSG IDs 462 in order to access one or more respective FBSs. In some embodiments, the user's wireless device (e.g., MS 112) receives the CSG TDs 462 wirelessly via one or more of the wireless connections between the MS and a BS and the MS and another FBS. In some embodiments, the user enters the CSG IDs 462 into the wireless device (e.g., MS 112) using one or more of I/O IF 445, keypad 450 and display 455. Furthermore, the user can subscribe to multiple closed FAPs and, thus, receive and store multiple CSG ID's 462 corresponding to the various closed FAPs to which subscriptions have been obtained.

In some embodiments, main processor 440 is configured to recalculate a paging listening interval and/or a paging listening slot. The main processor 440 is configured to determine whether a recalculation is necessary. The main processor 440 can use the same process utilized by a femto base station, such as FBS 104, or a macro base station, such as BS 102, to recalculate the position for the paging listening interval or paging listening slot.

Embodiments of the present disclosure provide a system and method to support paging with less interference in communication systems with femtocells. When femtocells send paging messages to idle mobile stations, which can be non-subscribers or subscribers of the CSG femtocell, the paging messages can cause a lot of overhead for paging because the CSG femtocell also is sending the paging to those mobile stations that do not subscribe the CSG of the femtocell. IEEE 802.16m-08/003r8 and its latest version, IEEE 802.16m System Description Document (SDD), 2009, the contents of which are incorporated by reference, states that femtocells may not send paging messages to non-subscribers in order to save paging overhead. However, a CSG femtocell may still interfere with a non-subscriber MS. For example, if a non-subscriber MS that is in idle mode passes by the CSG femtocell and receives strong interference from the CSG femtocell, then the paging message from the macrocells may not be heard by the MS.

IEEE 802.16, Rev2_D9a, discloses a procedure for paging a subscriber station. However, since the femtocell is not considered in IEEE 802.16, Rev2D9a, the macrocell mobile station may not be able to receive the paging message when near a femtocell. For example, when MS 112 is in idle mode and it is very close to FBS 104, which is a CSG femto base station operating in regular mode (not in low duty mode) to which MS 112 is not a subscriber; or if the paging message happens to be allocated in the active interval of the low duty mode of such CSG femtocell 104, and if the femtocell 104 is not paging MS 112, then the paging message to MS 112 from BS 102 can be overwhelmed by the FBS 104, hence MS 112 may not be able to receive the paging message. Here, the interference scenario is that the macrocell MS is interfered by the nearby inaccessible femtocell, however, the interference scenario is not limited to this example. There can be other interference scenarios, such as femto MS interfered by the macro BS, femto MS interfered by other femto BS, macro MS interfered by pico BS, and so forth. The embodiments in this disclosure apply to any interference scenario, for the coordination of interference mitigation and reliable paging delivery in multi-tier networks.

For the femtocells and macrocells operating at the same frequency allocation, when a non-subscriber mobile station, such as MS 112, comes near to a CSG femtocell, such as FBS 104, the connection in-between MS 112 and the macrocell may be lost because it may be overwhelmed by the large interference from FBS 104. MS 112 may lose the connection with BS 102 because of the strong interference from the FBS 104. Further, MS 112 cannot access FBS 104 because MS 112 is not a subscriber to FBS 104. Therefore, FBS 104 may not page MS 112 if MS 112 in idle mode.

Figure 5:
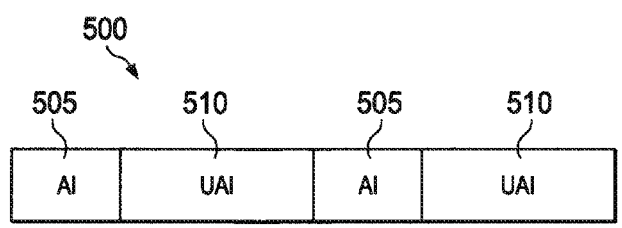
FIG. 5 illustrates a low duty cycle mode for a base station according to embodiments of the present disclosure.

FIG. 5 illustrates a low duty cycle mode for a base station according to embodiments of the present disclosure. The embodiment of the LDC mode pattern 500 shown in FIG. 5 is for illustration only. Other embodiments could be used without departing from the scope of this disclosure For interference mitigation, FBS 104 can be in the low duty cycle mode. IEEE 802.16m-08/003r8 and its latest version, IEEE 802.16m System Description Document (SDD), 2009, the contents of which are hereby incorporated by reference, further discusses a LDC mode. In the LDC mode, a base station is active only on limited time and frequency resources in the air interface. When there is no MS in its coverage, to reduce the interference to others and save its transmission energy or power, femtocells may enter low duty cycle (LDC) mode, which has a limited active resource such as frequency/time.

In the example shown in FIG. 5, the LDC mode pattern 500 includes an available interval (AI) 505 and an unavailable interval (UAI) 510. The LDC mode pattern 500 can include a pattern of AI's 505 and UAI's 510 occurring at periodic or aperiodic intervals. The relative sizes of the AI's 505 and UAI's 510 can vary. For example, a first AI 505 can be larger than a first UAI 510 and a second AI can be smaller than the first UAI 510 or a differently sized second UAI 510. In AI 505, FBS 104 has an active resource in the air interface and FBS 104 can transmit and receive. That is, during AI 505, FBS 104 may be transmitting or receiving signals. In UAI 510, FBS 104 may not transmit in the air interface or may transmit minimized signals such as the synchronization channel or the preambles; rather FBS 104 may receive from the air interface. That is, during the UAI 510, FBS 104 may be silent or almost silent. In addition, in the UAI 510, FBS 104 may have backhaul communication with core network. If no active user exists in the coverage area for FBS 104, FBS 104 can operate in LDC mode 500 such that FBS 104 can reduce the interference to other base stations. Additionally, operating in LDC mode 500 enables FBS 104 to save energy as well. The LDC patterns can be provided to the MS by the network so that the MS can memorize the LDC patterns and use them to scan or search for the base stations in LDC mode. For example, if the MS knows that the BS in LDC mode would not transmit anything in certain interval, then the MS would not try to scan for such BS in the interval where the BS may not transmit because nothing from the BS would be in the air.

In LDC mode, the AI 505 and UAI 510 may be periodical or may not be periodical. For example, the base station may include one UAI 510 when needed; then there can be UAIs 510 located in different positions (e.g., here and there) regularly or irregularly and/or periodically or non-periodically, based on the base station configuration. Such scenario can be regarded as a regular mode of a base station including some UAIs from time to time or it could also be regarded as a separate configuration of the LDC mode. The LDC mode and/or LDC patterns throughout this disclosure are meant to refer to their general meaning, which refers to any transmission configuration pattern which may have some UAI from time to time regularly or irregularly, where in the UAI 510 the base station may not transmit, or transmit with limited or less resource such as in limited or less time, frequency, power, space angle, and so forth, comparing with the transmission in AI 505. The LDC mode, or LDC patterns, can be referred by other names in different systems. The base station can be in LDC mode when there are no active mobile users, or no active sessions, or mobile users are active but they are in sleep mode, and so forth.

The network entity, such as BS 102, can send (e.g., by broadcasting, multicasting, unicasting, and so forth) the LDC mode pattern 500 to MS 112. As such, both BS 102 and MS 112 are aware of the LDC mode pattern 500.

In some embodiments, to detect the femtocells operating in LDC mode, all of the femtocells operate at the same frequency allocation and use the same LDC pattern. For example, BS 102 can send to the MSs in its coverage such as MS 112 the same LDC mode pattern 500 to be used by FES 104, FBS 144 and FBS 154. The same LDC mode pattern 500 may be used so that MS 112 can synchronize (sync) and detect the femtocells operating in LDC mode more efficiently, that is, the MS can detect the sync channel for multiple BSs in LDC mode in one common interval, rather than in multiple intervals.

In some embodiments, one or more femtocells use one of a number of multiple (countable) LDC patterns. For example, FBS 104 and FBS 144 may be operating using different LDC mode patterns 500 while FBS 154 uses the same pattern 500 as FBS 104. In another example, FBS 104, FBS 144 and FBS 154 each operate using different LDC mode patterns 500.

In some embodiments, all the femtocells and macrocells are operating at the same frequency allocation.

Figure 6A:
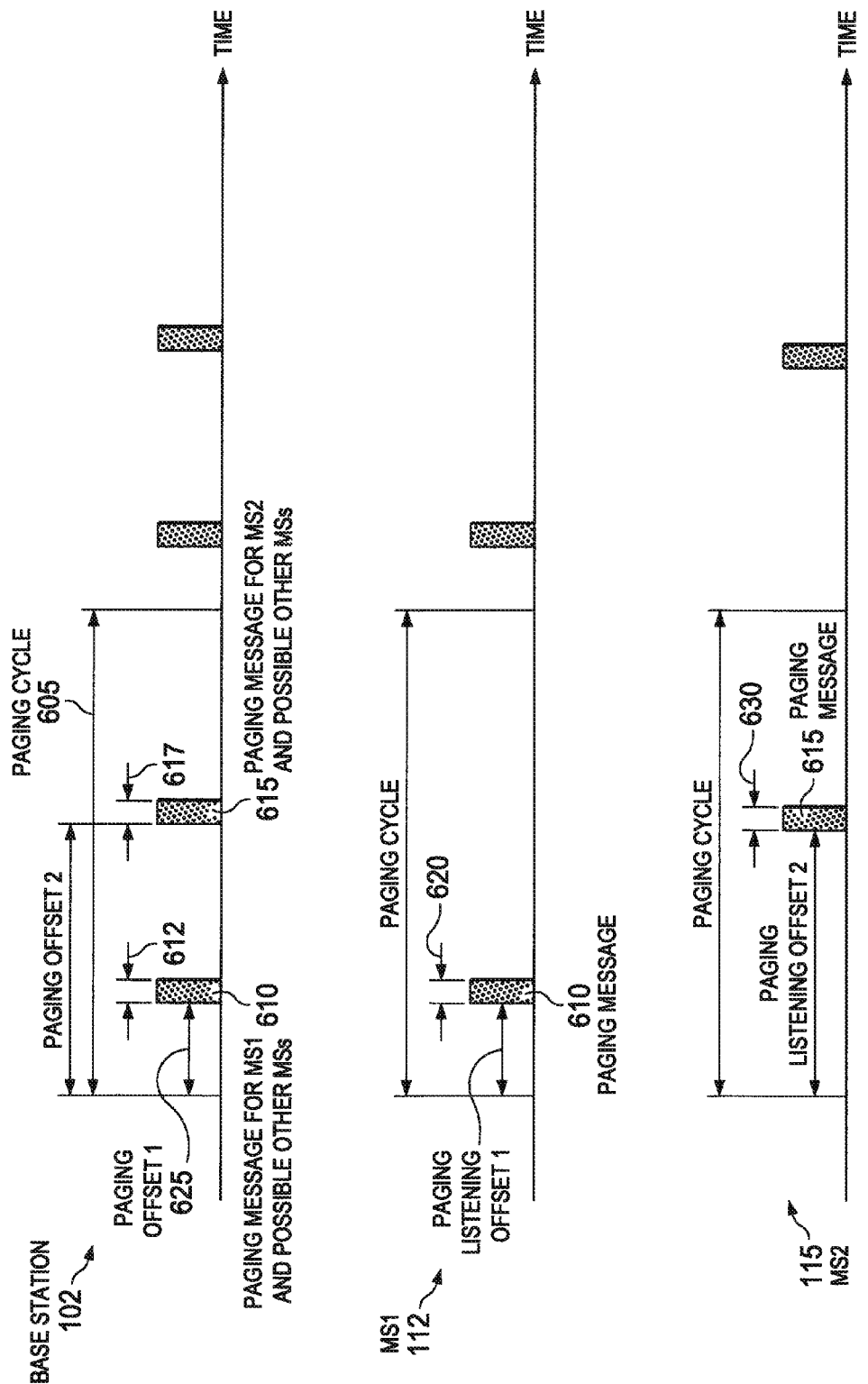
Figure 6B:
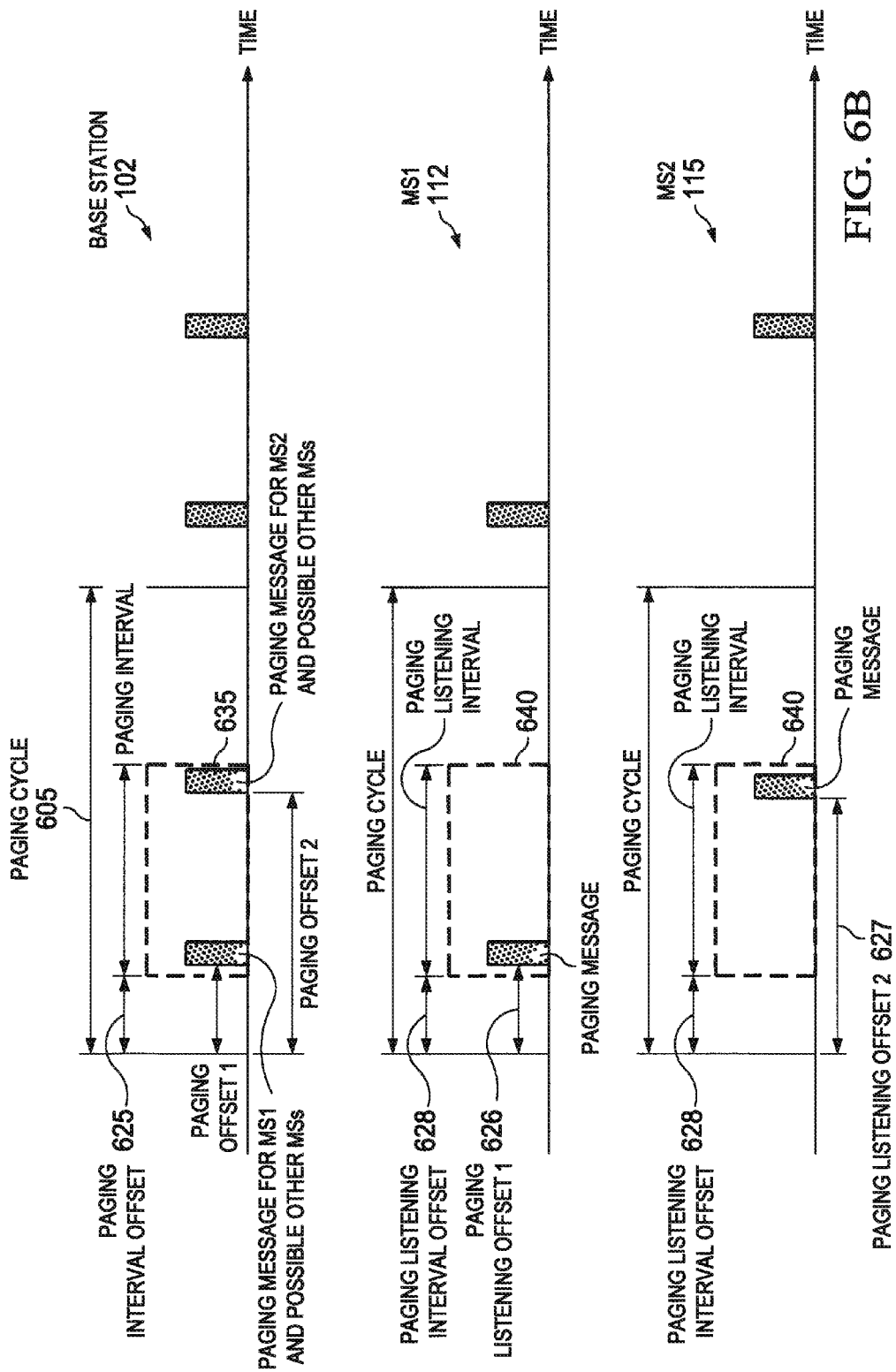

FIGS. 6A through 6C illustrate an exemplary process for paging mobile stations in idle mode. In the example shown in FIG. 6A, a paging controller (not shown) tells BS 102 which mobile stations are to be paged. It will be understood that the paging controller can instruct more than one base station to page respective mobile stations. In some embodiments, the paging controller instructs one or more femto base stations, such as FBS 144 and FBS 154, which mobile stations are to be paged. Then, during a paging cycle 605, BS 102 broadcasts one or more paging messages 610, 615 in paging slots 612 and 617 respectively. The paging messages, 610, 615 can include the mobile station identifiers to be paged and some other assisting information. The paging slots can be similar to or longer than the time needed for transmitting the paging message. If the paging slot is shorter than the time needed for the paging message, the paging slot may be extended. The mobile stations, such as MS 112, which are in idle mode wake up at a certain time to listen to the paging message 610, 615. When MS 112 determines that its identifier (MSID) is included in the paging message 610, then MS 112 determines that it is paged and MS 112 performs further action such as exiting idle mode and performing network re-entry. If the paging message 610 does not include an MSID for MS 112, MS 112 proceeds to a paging unavailable interval in which MS 112 is not listening and remains in idle mode.

When in idle mode, MS 112 can have a period of paging listening time and paging listening unavailable time periodically within the paging cycle 605. The paging cycle 605 occurs periodically such that multiple paging cycles 605 exist although only one paging cycle 605 is illustrated in FIGS. 6A through 6C. In the paging cycle 605, the paging messages 610, 615 can be sent by BS 102 at a time that is offset within the paging cycle 605. The timing for BS 102 to broadcast paging messages 610, 615 to MS 112 and MS 115 should be aligned to the timing for a listening period ("slot") 620 for MS 112 and listening slot 630 for MS 115 to listen to the paging messages. For example, paging slot 612 should align with listening slot 620 and paging slot 617 should align with listening slot 630. The timing alignment may already take into account the delays such as propagation delay from the BS to the MS. The timing alignment for BS 102 and MS 112 can be achieved by explicit signaling or by the same predefined algorithm at both BS 102 and MS 112 to calculate the timing information for paging message. For example, the predefined algorithm can be a function (such as a hash function) of the paging cycle 605 and desired timing offset 625 for the paging message (or paging slot and listening slot) within the paging cycle 605.

In a paging cycle 605, different MSs 112, 115 may be paged in different paging slots 612, 617, so that the paging message can be shortened. For example, MSs 112, 115 are divided into groups with different groups of MSs being paged in different time offsets. In some embodiments, a predefined process (such as a predefined algorithm) executed at both BS 102 and MS 112 to calculate the timing information for the paging message 610 can include a function (such as a hash function) of MS identifiers. Therefore, MS 112 is able to know which listening interval slot 620, 630 contains the possible message for MS 112 and, as such, MS 112 does not need to listen when the other listening interval slots 620, 630, which is associated with another group of MS's. For example, using the predefined function, MS 112 can determine that listening interval slot 620 contains the paging message 610 for MS 112 and, as such, MS 112 does not need to listen to listening interval slot 630. The predefined process can hash the MS identifiers to the index of paging slots, such as, letting MSs with identifiers ending with '00', '01', '10', '11' be in the first, second, third, and fourth slot, respectively. In some embodiments, explicit signaling can be alternatively used wherein BS 102 explicitly notifies MS 112 which slots to listen. In some embodiments, to make the paging message shorter, the globally unique MS identifier (MSID) can be hashed into a shorter identifier.

FIG. 6B illustrates a paging interval and a paging listening interval according to the present disclosure. Within a paging cycle 605, the BS 102 can define one or multiple paging intervals 635, within which BS 102 pages MSs 112, 115. A paging interval offset 625 identifies the beginning time of the paging interval 635. The interval offset 625 can be an attribute of BS 102. In some embodiments, the paging interval offset 625 can be determined by a paging area identifier, or a base station paging group ID (BSPG ID), where all the base stations with the same BSPG ID can have the same paging interval offset 625. A paging area can include many base stations and all the base stations can share a BSPG ID. A base station may be involved in multiple paging areas, and therefore, a BS can include multiple BSPG IDs. In some embodiments, BS 102 broadcasts its BSPG ID to MS 112 and MS 115. MS 112 and MS 115 each include a respective paging listening interval offset 626, 627 according to the paging interval offset 625 of BS 102. Within one paging interval 635, BS 102 can page multiple groups of MSs. Each group can include a different paging listening offset 626, 627 and a common paging listening interval offset 628, which also is related to MS identifiers. The paging listening offsets 626-627 also can be defined relative to the beginning of the paging listening interval 640 as shown in FIG. 6C. For example, the paging interval offset 625a identifies the beginning time of the paging interval 635, the first paging slot offset 625b identifies the beginning of the first paging slot 612 and the second paging slot 625c identifies the beginning of the second paging slot 617. In addition, the paging listening offset 628a identifies the beginning of the paging listening interval 640, a first listening slot offset 628b identifies the beginning of the first listening slot 620 and the second listening slot 628c identifies the beginning of the second listening slot 630. In one listening interval 640, MS 112 and MS 115 do not need to listen all the time, but only listen when the message possibly relevant to them is transmitted. In some embodiments, the timing offsets 625-629 can be determined by explicit signaling. In some embodiments, the timing offsets 625-629 can be determined by predefined algorithms at BS 102 and MSs 111, 115.

Embodiments of the present disclosure mitigate the interference from femtocell to macrocell, so as to ensure the paging message to MS 112, which is located very close to FBS 104, which is a CSG femtocell to which MS 112 does not have the right, or has limited or low priority, to access because MS 112 is not a subscriber to FBS 104.

For ease of illustration, the time slot in which BS 102 transmits a paging message is referred to as the paging slot, and the listening interval slot (that is, the time slot) in which MS 112 listens to the paging message is referred to as the listening slot. However, each slot can be referred to by other names without departing from the scope of this disclosure.

FIG. 7 illustrates a process for paging in an unavailable interval according to embodiments of the present disclosure. The embodiment of the paging process shown in FIG. 7 is for illustration only. Other embodiments could be used without departing from the scope of this disclosure.

In some embodiments, the network entity, such as BS 102, checks whether any of the paging messages 610, 615 in a paging cycle 605 will be broadcasted in the AI 505 of the LDC for the femtocells, FBS 104, FBS 144, FBS 154. As shown in the example illustrated in FIG. 7, the first paging message 610 is broadcasted in a paging slot 612, which occurs in the AI 505. Using a predefined process, such as a predefined function or algorithm BS 102 recalculates a paging offset 725 such that the paging message 610 can be transmitted in the UAI 510b of the LDC of FBS 104, FBS 144 and FBS 154. Then BS 102 broadcasts the paging message 610 in the paging slot 712 at the new paging offset 725.

MS 112 checks whether its expected paging message 610 will be in the AI 505. When MS 112 determines that the paging message 610 will occur in a paging listening slot 620, which occurs in the AI 505, MS 112 uses the same predefined process used by BS 102 to recalculate a paging listening offset 726 such that the listening slot 720 occurs within the UAI 510. Then, MS 112 listens to the paging message 610 at the new listening slot 720 based on the new paging listening offset 725b.

In addition, MS 115 checks whether its expected paging message 615 will be in the AI 505. If MS 115 determines that the paging message 615 will occur in the AI 505, MS 115 uses the same predefined process used by BS 102 to recalculate a paging listening offset such that MS 115 will listen for the paging message 615 in a listening slot within the UAI 510. However, if MS 115 determines that the paging message 615 occurs in the UAI 510, MS 115 does not recalculate the paging offset. MS 115 listens to the paging message 615 at the previous listening interval slot 630 based on the previous paging listening offset 627.

The process for determining AI and paging conflicts as well as for adjusting the paging message by recalculating the paging offsets may be performed repeatedly, or periodically, because the pattern of paging slots in the AI 505 can vary over time and since periodicity of the paging cycle 605 and the femto low duty cycle mode 500 may not be the same. In addition, it will be understood that although one MS is paged once within one paging cycle 605 in the example, multiple paging slots for one MS can occur without departing from the scope of this disclosure.

Accordingly, BS 102, MS 112 and MS 115 can opportunistically utilize the UAI 510 of the femtocells in LDC mode, to mitigate the interferences from femtocells to macrocells. Therefore, MS 112 can have a larger chance to receive the paging message 610, even when MS 112 is very close to FBS 104. In addition, overhead and latency in notifying/updating MS 112 regarding the timing of the recalculated paging intervals of the macrocells can be reduced because the MS uses predefined algorithm to determine the paging listening timing, rather than extracting such timing via the signaling from the BS.

Figure 8:
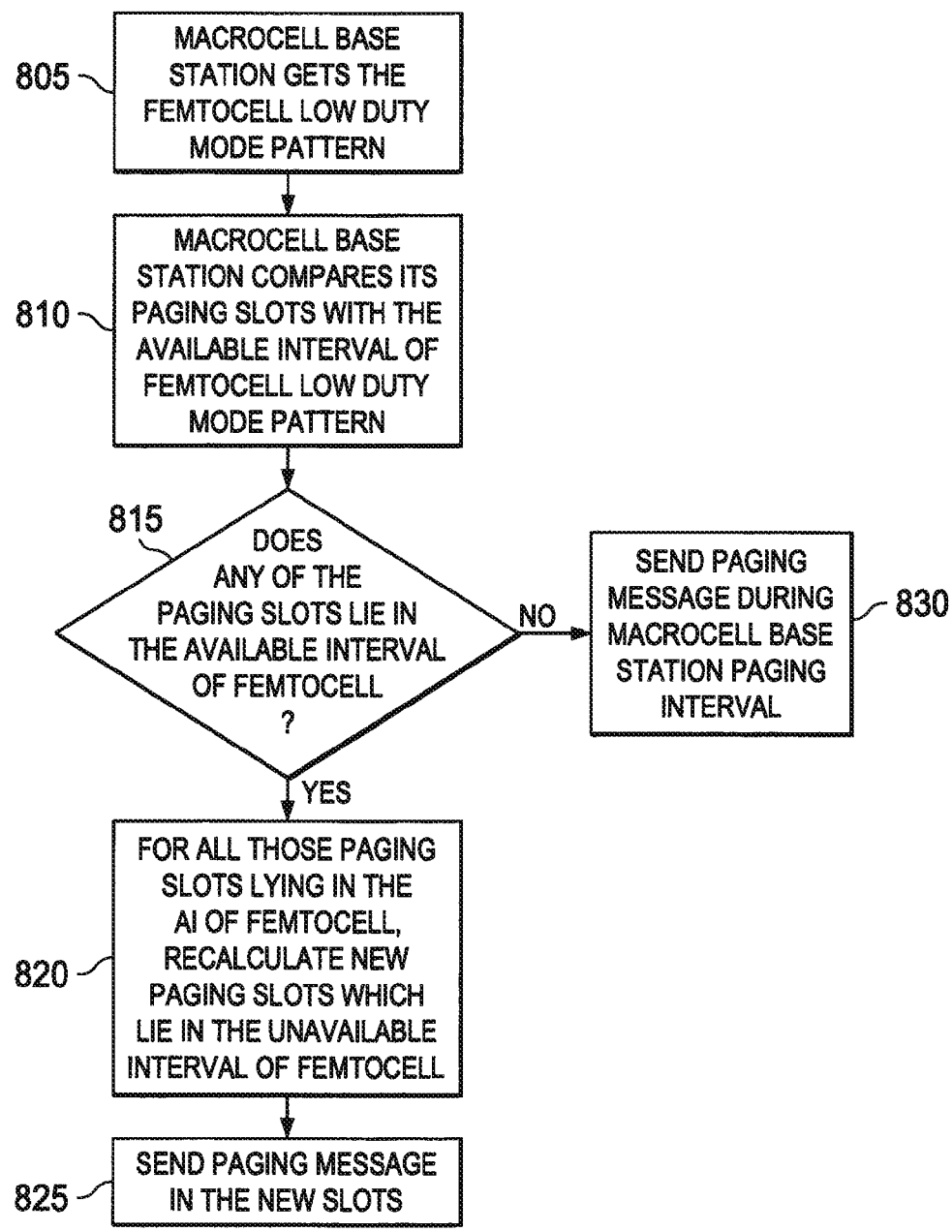
FIG. 8 illustrates a process for changing paging timing according to embodiments of the present disclosure.

FIG. 8 illustrates a process for changing paging timing according to embodiments of the present disclosure. The embodiment of the process 800 shown in FIG. 8 is for illustration only. Other embodiments could be used without departing from the scope of this disclosure.

In block 805, BS 102 identifies the femtocell low duty mode pattern 500. BS 102 may receive the femtocell LDC pattern 500, such as via a backhaul connection. In some embodiments, the LDC pattern 500 is predefined. BS 102 compares the paging slots 612, 617 with the femtocell LDC mode pattern 500 in block 810. In block 815, BS 102 determines if any of the paging slots 612, 617 overlap with the AI 505 of the LDC mode pattern 500. If any of the paging slots 612, 617 overlaps with the AI 505, BS 102 recalculates one or more new paging offsets 725 in block 820. BS 102 recalculates the paging slot offset 725 such that the new paging slot 712 occurs within the UAI 510 of femtocells. In block 825, BS 102 transmits the paging message 610 in the new paging slot 712. If BS 102 determines that the paging slots 612, 617 do not overlap with the AI 505 in block 815, BS 102 transmits the respective paging messages 610, 615 during the original paging slots 612, 617 in block 830.

Figure 9:
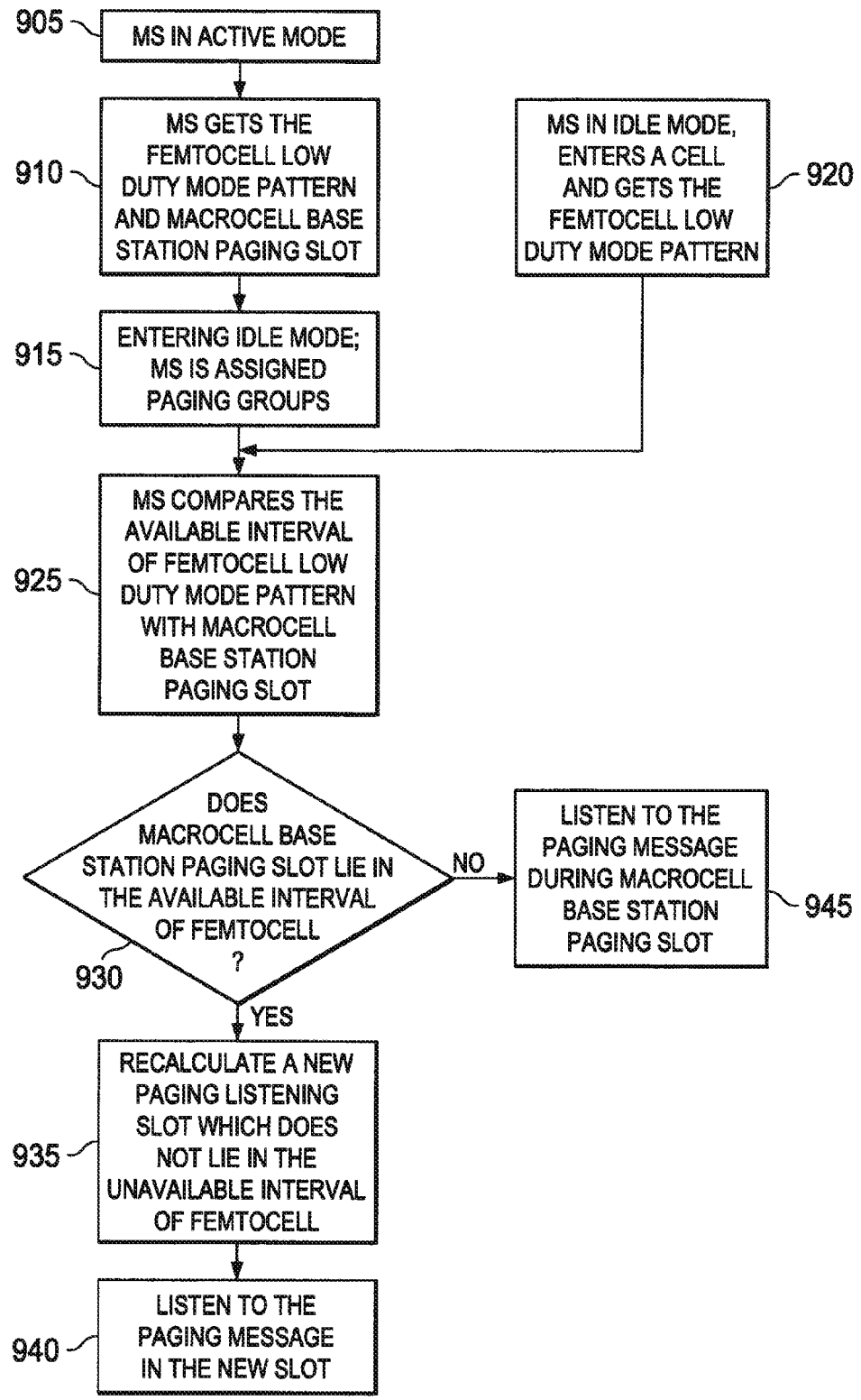
FIG. 9 illustrates a process for changing listening interval timing according to embodiments of the present disclosure.

FIG. 9 illustrates a process for changing listening interval timing according to embodiments of the present disclosure. The embodiment of the process 900 shown in FIG. 9 is for illustration only. Other embodiments could be used without departing from the scope of this disclosure.

In block 905, MS 112 is in active mode. MS 112 identifies the femtocell LDC mode pattern 500 and macrocell paging slot 612 in block 910. MS 112 may receive the femtocell LDC pattern 500 via signalling. In some embodiments, the LDC pattern 500 is predefined. MS 112 enters idle mode in block 915. MS 112, in idle mode, is assigned to a paging group. Additionally, MS 112 may be in idle mode as it enters a cell 124 in block 920. In block 920, MS 112 identifies the femtocell LDC mode pattern 500. The LDC pattern 500 can be predefined or received via signaling. MS 112 compares the AI's 505 in the femtocell LDC mode pattern 500 with the paging slot 612 in block 925. In block 930, MS 112 determines if the paging slot 612 occurs within the AI 505 of the LDC mode pattern 500. If the paging slot 612 occurs within the AI 505, MS 112 recalculates a new paging listening slot 720 in block 930. MS 112 recalculates the listening offset 726 such that the new paging listening slot 720 occurs within the UAI 510 of FBS 104. In block 940, MS 112 listens for the paging message 610 in the new paging listening slot 720. Alternatively, if MS 112 determines that the paging slot 612 does not overlap with the AI 505 in block 930, MS 112 listens for the paging message 610 during the original paging listening slot 620 in block 945.

The adjustment of the paging slot 612, listening slot 620, paging offset 625 and/or paging interval offset 625b may be done per paging cycle 605 in order to avoid the overlapping of a new paging slot 720 and AI 505. In other words, this adjustment can be performed per paging cycle 605. If the next paging slot 612 based on the regular idle mode operation does not overlap with the AI 505 in the next paging cycle 605, both BS 102 and MS 112 can use the timing of the paging slot 612 and listening slot 620 as determined by the regular method. This will ensure that MS 112 knows where to locate a paging message 610 no matter whether MS 112 has just entered a cell 124 or has been in the cell 124 for a long period of time.

However, if BS 102 explicitly signals the usage of the new paging offset 725 and other parameters for calculating the timing of the paging slot 712, all the MSs, such as MS 112 and MS 115, that are affected use the new parameters.

In some embodiments, the predefined process for recalculating the paging and paging-listening offsets is a predefined algorithm. The predefined algorithm to recalculate the paging/paging-listening offset can be a function (such as a hash function) of a low duty cycle patterns of femtocells and one or more of: MSIDs or some sequences derived from MSIDs, macro base station identifiers, paging cycle, paging area identifiers, BSPG IDs, and the like.

For example, in one paging cycle, there are M paging offsets (0, 1, . . . , M-1) and M associated paging slots (0, 1, . . . , M-1), with each paging slot associating with one paging offset. In systems that do not include the femtocells LDC pattern, the algorithm to calculate the paging/paging-listening offsets may be a function of the MS IDs. The paging offset/slot I for MS 112 with identifier MS_ID can be determined by Equation 1:

$$\text{Paging\_Offset I} = \text{MS\_ID modulo M}. \quad \text{[Eqn. 1]}$$

However, in embodiments of the present disclosure, the algorithm includes the femtocell LDC mode pattern. For example, in one paging cycle, among M available paging slots (0, 1, . . . , M-1), there are L paging slots that occur within the UAI of femtocell LDC. These L paging slots are placed in UAI of LDC in a new set $S=(s_0, s_1, \ldots, s_{L-1})$. For MS 112 with identifier MS_ID, if its paging slot I is not in set S, the paging slot is recalculated and a new slot I is calculated according to Equation 2:

$$\text{NEW\_Paging\_offset I} = s_l, \text{ where } s_l \text{ is in S, and}$$
$$l = \text{MS\_ID modulo L}. \quad \text{[Eqn. 2]}$$

In Equation 2, S is the set of paging offsets in UAI of femocell LDC in one paging cycle.

In some embodiments, both MS 112 and BS 102 shift a paging listening slot 620 out of the AI 505. For example, the paging listening slot 620 could be shifted from the AI 505 such that the new listening slot 720 occurs at the beginning of the immediately next UAI 510b, the middle of the immediately next UAI 510b, or a pre-determined place of the immediately next UAI 510b. Similarly, the paging listening slot 730 could be shifted to the beginning of the immediately previous UAI 510a, the middle of the immediately previous UAI 510a, or a pre-determined place of the immediately previous UAI 510a.

In addition, the algorithm can be configured to randomly choose one slot from set S. Alternatively, the hash function can use the some part of MS_ID as the input (for example, the first 8 most significant bits (MSB) of MS_ID; some function of MS_ID; and the like). The hash function can also consider other parameters as the input, such as the macro base station ID, the paging area ID, paging group ID, and the like. For example, for different paging area ID, the paging offsets can be further shifted differently.

In some embodiments, the network entity, such as BS 102, recalculates a paging offset 725 for the paging message 610 that occurs within the AI 505 of the LDC of femtocells such that the resulting new listening slot 720 occurs within the UAI 510 of the LDC of femtocells. In addition, BS 102 signals MS 112 regarding the recalculated paging offset. MS 112 receives the new paging offset 725 from the signaling from BS 102 and listens to the paging message 610 in the listening slot 720.

Figure 10:
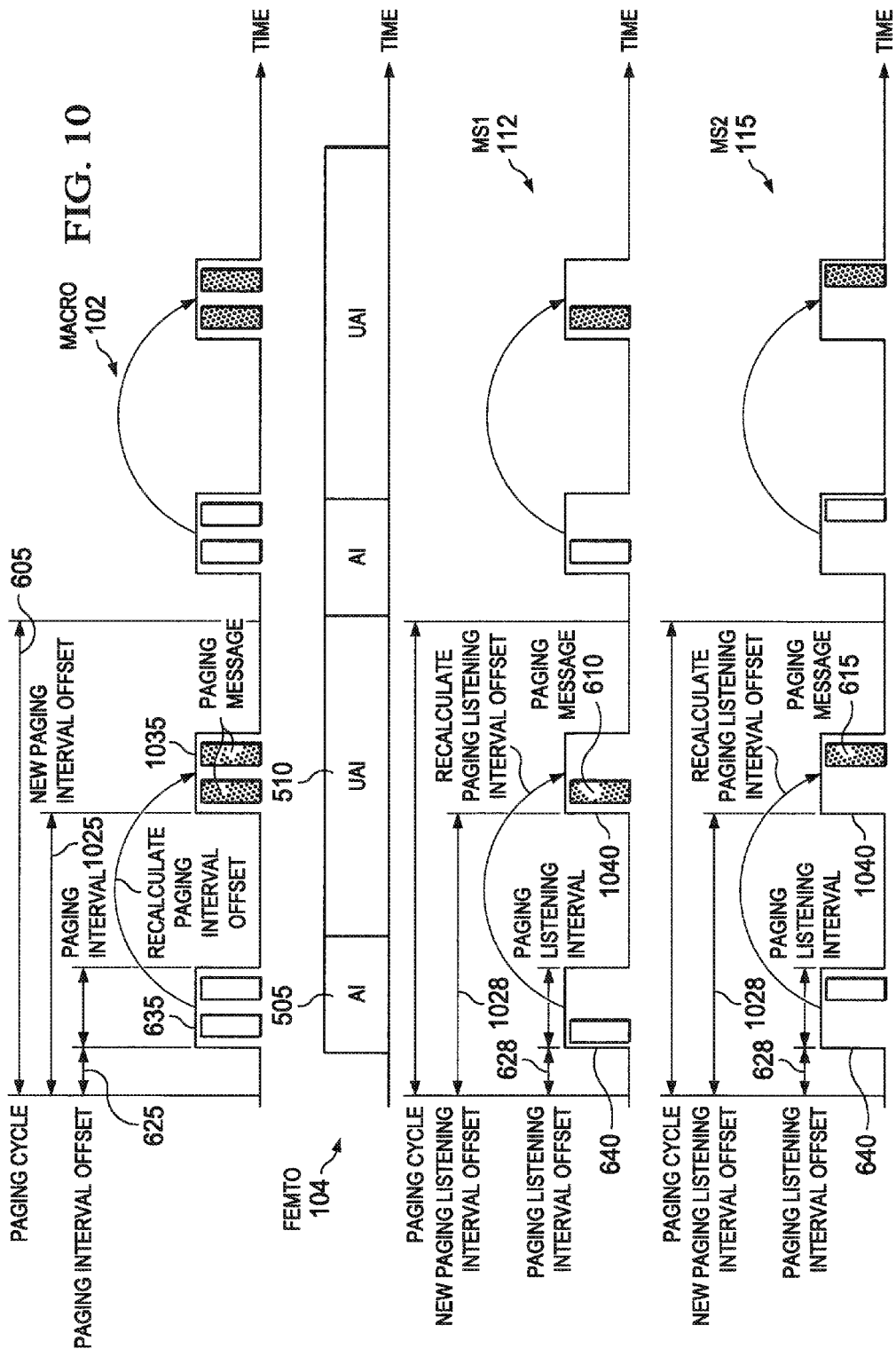
FIG. 10 illustrates a process for paging interval offset changes according to embodiments of the present disclosure.

FIG. 10 illustrates a process for paging interval offset changes according to embodiments of the present disclosure. The embodiment of the paging interval offset change shown in FIG. 10 is for illustration only. Other embodiments could be used without departing from the scope of this disclosure.

In some embodiments, the network entity, such as BS 102, checks whether some of or the entire paging interval 635 overlaps with the AI 505 in the same paging cycle 605. BS 102 recalculates the paging interval offset 625 for the paging interval 635, such that the resulting new the paging offset 1025 can reduce or remove the overlapping of the new paging interval 1035 and the AI 505. BS 102 broadcasts the paging message 610 in the paging interval 1035 at the new paging interval offset 1025. MS 112 checks whether its expected paging listening interval 640 overlaps the AI 505. If the paging listening interval 640 overlaps the AI 505, MS 112 uses the same process used by BS 102 to recalculate a new paging listening interval offset 1028. MS 112 then listens to the paging message 610 in the new paging listening interval 1040. Additionally, MS 115 checks whether its expected paging listening interval 640 overlaps the AI 505. If the paging listening interval 640 overlaps the AI 505, MS 115 uses the same process used by BS 102 to recalculate the new paging listening interval offset 1028. MS 115 then listens to the paging message 615 in the new paging listening interval 1040.

Here, the offset 625 of the paging interval 635 and the offset 628 for the paging listening interval 640 are recalculated. Since the paging interval 635, which can contain one or multiple paging slots 612, 617 for paging messages 610, 615, is being adjusted, the multiple paging slots 612, 617 and listening slots 620, 630 are adjusted as opposed to the adjustment of individual paging slots 612, 617 and listening slots 620, 630 as shown in FIG. 7 or individual paging slot offset. Therefore, the embodiment can have a larger granularity.

In some embodiments, the predefined process to recalculate the paging/paging-listening interval offset can be a function (such as a hash function) of low duty cycle patterns of femtocells, and one or more of: MSIDs or some sequences derived from MSIDs, macro base station identifiers, paging cycle, paging area identifiers, BSPG IDs, and the like.

For example, assuming in one paging cycle, there are M possible paging interval offsets (0, 1, . . . , K-1) and the femtocells LDC pattern is not considered, the function to calculate the paging/paging-listening interval offset may be a function (such as a hash function) of the BSPG IDs. Multiple base stations can be grouped into one paging group, and they can share a paging group ID. The paging interval offset J macro BS with BSPG_ID can be calculated according to Equation 3:

$$\text{Paging\_Interval\_Offset J} = \text{BSPG\_ID modulo K}. \quad \text{[Eqn. 3]}$$

However, when the femtocells LDC pattern is considered to recalculate the paging offset, the function will be adjusted to take into account of femtocell LDC. For example, assuming in one paging cycle, among K paging interval starting with offsets (0, 1, . . . , K-1), there are $(Q_0, Q_1, \ldots, Q_N)$ paging intervals have (0, 1, . . . , N) units overlap with AI of femtocell LDC, where N-unit is the minimum of the length of the AI and the paging cycle. Note that the unit can be different in different systems, such as frame, subframe, and so forth. Suppose $Q_0 = Q_1 = \ldots = Q_{i-1} = 0$, $Q_i > 0$, that is, $Q_i$ is the first non-zero element in $(Q_0, Q_1, \ldots, Q_N)$.

R denotes the set of all these $Q_i$ offsets associated with the paging intervals that include the least units of overlapping with AI as illustrated in Equation 4:

$$R = (r_0, r_1, \ldots, r_{Qi-1}) \quad \text{[Eqn. 4]}$$

For BS with BSPG_ID, if its paging interval starting with offset J includes more than $Q_i$ units overlapping with AI, the paging interval is recalculated and a new slot I is produced by Equation 5:

$$\text{NEW\_Paging\_Interval\_offset } J=r_I, \text{ where } r_I \text{ is in R,} \text{ and } I=\text{BSPG\_ID modulo } Q_i.$$ [Eqn. 5]

It will be understood that the functions shown by Equations 4 and 5 illustrate one example function. Other processes could be used without departing from the scope of this disclosure, such as randomly choosing one offset from set R, or the hash function can use the some part of BSPG_ID as the input (for example, the first 3 most significant bits (MSB) of BSPG_ID; some function of BSPG_ID; and the like). The hash function can also consider other parameters as the input, such as the macro base station ID, the paging area ID, MSID, and the like. Therefore, the paging interval timing will be a function of Low Duty Cycle patterns of femtos.

In some embodiments, when the network entity, such as BS 102, recalculates a paging interval offset 625 for the paging interval 635 that overlaps the AI 505 such that the resulting new the paging interval 1040 includes less or no overlapping with the AI 505. BS 102 also signals MS 112 regarding the recalculated paging offset 1025. MS 112 receives the new paging interval offset 1025 from the signaling from BS 102 and listens to the paging message 610.

BS 102 can use explicit signaling to notify MS 112 regarding the new paging interval offset 1025. The explicit signaling may introduce overhead because of the signaling, but it can be used to make the paging interval offset 1025 assignment more flexible and reduce the complexity for (re-)calculating the listening slot 720 by MS 112.

In some embodiments, the recalculation of the paging interval offset 1025 as shown in FIG. 10 and paging slot 626, 627 offset as shown in FIG. 7 can be jointly performed. For example, the recalculation of paging interval offset 625 (and listening interval offset 628) can be performed first. If the new intervals 1035, 1040 that do not overlap with the AI 505 can be found, then the process ends. Otherwise, BS 102 and MS 112 each recalculate the paging offset 625 and listening offset 626 respectively to determine the new paging slot 712 and listening slot 720.

In some embodiments, a plurality of femtocells, such as FBS 104, FBS 144 and FBS 154, in the same paging area reserve a common interval and make the common interval part of the unavailable interval 510, macrocells, such as BS 102, in the same paging area use the common interval to broadcast paging messages. The timing information of the common interval can be fixed or signaled to MS 112 so that MS 112 listens to the paging message in the common interval when MS 112 is in idle mode.

Therefore, the timing for the paging interval 1035 can be fixed or signaled so that there is no need for BS 102 or MS 112 to judge whether the paging interval 1035 will overlap with the AI 505 or not.

In some embodiments, FBS 104 can reserve a particular interval for macrocells paging messages and/or for other purposes such as for interference mitigation. The reserved interval does not need to be associated with the unavailable interval 510. The timing information of the reserved interval can be fixed or signaled to MS 112. In some embodiments, the timing information of the reserved interval can be sent or signaled (e.g., by broadcasting, unicasting, multicasting, and so forth) to the network entity such as MS by the other network entity, such as BS 102 or FBS 104 as part of the system configuration. The additional signaling, such as broadcast of the timing information of the reserved interval, can make the resource allocation more configurable if needed. The signaling, such as broadcast of the timing information of the reserved interval, can be made in advance before the reserved interval being effective.

In some embodiments, before MS 112 enters idle mode, the network configures the paging cycle, paging listening offset and paging listening interval such that all the paging slots always fall in the UAI 510, or the overlapping of the number paging slots and the AIs 505 are minimized. Therefore the network may also need to configure the low duty cycle mode at the same time such that the paging slots and the AI 505 are configured to avoid each other (that is, not overlap) as much as possible. In some embodiments, the network may modify an existing low duty mode and/or existing idle mode parameters in order to minimize the overlapping between the paging slots and the AIs 505. The parameters, such as the timing information of the existing/modified LDM and/or existing/modified idle mode parameters, can be sent or signaled (e.g., by broadcasting, unicasting, multicasting, and so forth) to the network entity, such as MS, by the other network entity, such as BS 102 or FBS 104, as part of the system configuration or reconfiguration. The additional signaling can make the resource allocation more configurable if needed. The signaling such as broadcast of the (re)configured LDM pattern parameters, such as the timing information and/or idle mode parameters, such as those timing offsets mentioned above, can be made in advance before the parameters being effective.

In some embodiments, one or more (or all) of FES 104, FES 144 and FBS 154, can adjust their transmission so that no transmission from a FBS 104, FBS 144 and FBS 154 occurs when BS 102 is broadcasting a paging message. This applies equally for each femtocell BS operating in either normal operation mode or in low duty operation mode. Through the network and/or through BS 102 (that is, the overlapped macro BS), FBS 104 knows when the BS 102 may broadcast paging messages. FBS 104 in normal operation mode halts any transmission in those paging slots, or minimizes the transmission in those paging slots. FBS 104 in low duty operation mode halts or minimizes any transmission in those paging slots if those periods happen in the AI 505. In this example, neither BS 102 nor MS 112 needs to adjust the operation in idle mode. Either in regular mode or in low duty mode, the parameters such as the timing of the paging slots where the transmission would be halted or minimized can be sent or signaled (e.g., by broadcasting, unicasting, multicasting, and so forth) to the network entity, such as MS by the other network entity, such as BS 102 or FBS 104, as part of the system configuration or reconfiguration. The additional signaling can make the resource allocation more configurable if needed. The signaling such as broadcast of the parameters such as the timing of the paging slots where the transmission would be halted or minimized mentioned above can be made in advance before the parameters being effective.

In some embodiments, the adjustment of paging slots or the adjustment of transmissions from FBS 104 leaves enough room for MS 112 to be paged to complete the network re-entry. For example, the paging slot can be moved from the AI 505 enough such that a MS 112 (a paged MS) can finish network re-entry without suffering serious interference from FBS 104. Similarly, if FBS 104 tries to avoid transmission when BS 102 is broadcasting a paging message, FBS 104 can minimize the usage of the resource scheduled by BS 102 for any paged MS to complete network re-entry.

Figure 11:
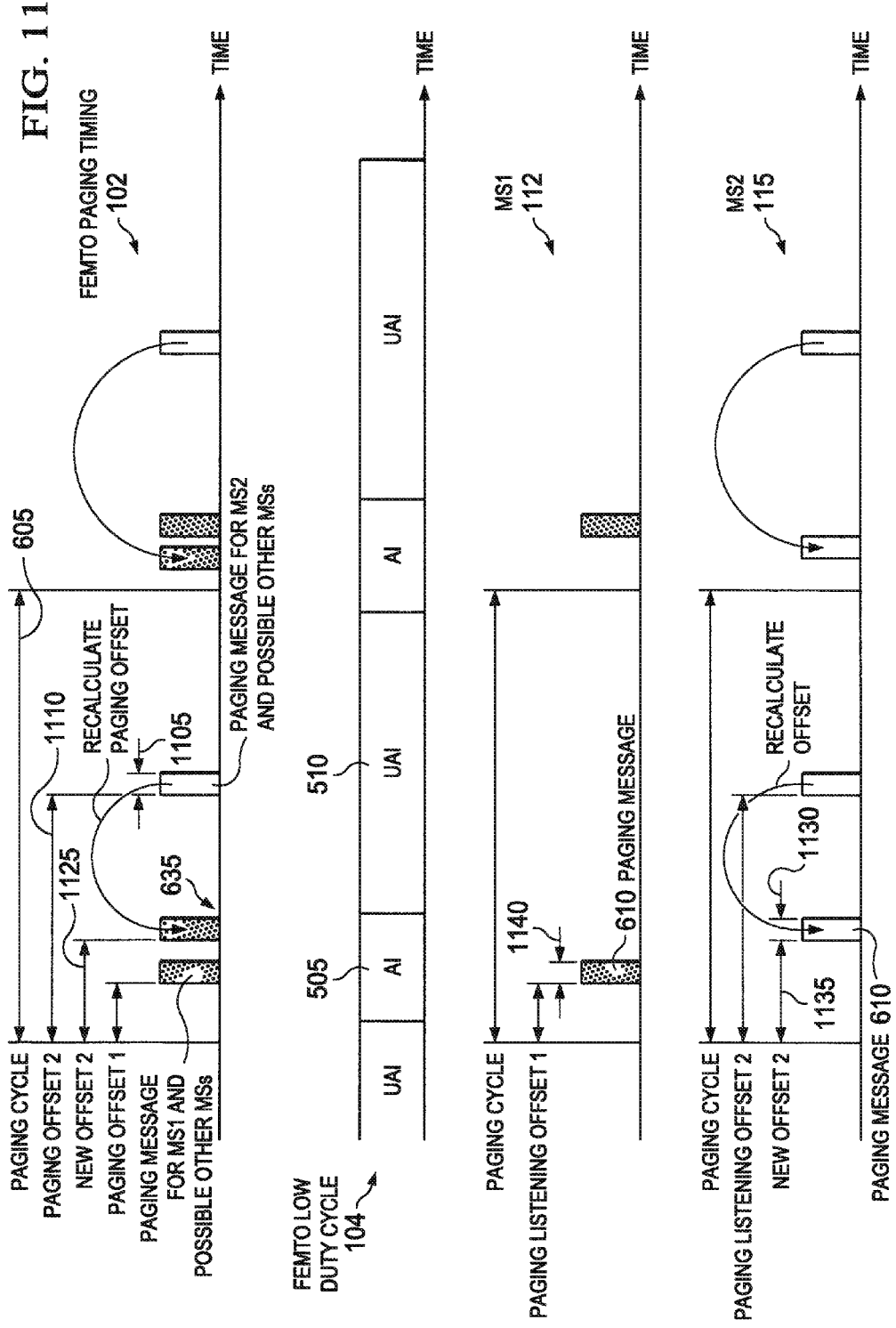
FIG. 11 illustrates a process for paging interval offset changes for a femtocell to page a mobile station according to embodiments of the present disclosure.

FIG. 11 illustrates a process for paging interval offset changes for a femtocell to page a mobile station according to embodiments of the present disclosure. The embodiment of the paging interval offset change shown in FIG. 11 is for illustration only. Other embodiments could be used without departing from the scope of this disclosure.

In some embodiments, FBS 104, operating in low duty mode, can page MS 115 in idle mode. FBS 104 can broadcast paging messages in the active interval 505. When MS 115 listens to FBS 104 for paging messages, MS 115 aligns the paging listening offset with the available interval for FBS 104. If needed, the recalculation of the timing using a predefined process similar to the embodiment described hereinabove with respect to FIGS. 5 through 10, to reduce or minimize or remove the overlap of the time for paging message and the UAI of the LDC, to make the time for paging message to overlap with the AI of the LDC as much as possible, to reduce the total transmission time of femto so as to reduce the interference to other BSs. For example, if the original paging slot 1105, based upon the original paging offset 1110, for MS 115, when FBS 104 is in the regular mode, overlaps with the unavailable interval 510, FBS 104 recalculates a new paging offset 1125 to overlap with the active interval 505 as much as possible using a predefined process. When MS 115 detects that the original paging slot 1105 overlaps with the unavailable interval 510, MS 115 uses the same predefined process to recalculate the new paging listening offset 1135 and paging listening slot 1130 to listen to the paging messages. The predefined process can be a function (such as, a hash function) of the LDC patterns of the femtocells, the identifiers of the MSs, the paging cycle, the required paging offsets, and so forth. In addition, MS 112 detects that the original paging slot 1140 occurs within the AI 505, therefore MS 115 does not recalculate offsets; rather MS 115 listens for the paging messages in the original paging slot 1140.

In some embodiments, the offsets 1125, 1135 that are recalculated are the paging/paging-listening interval offsets. Therefore, the embodiment can have a larger granularity.

Figure 12:
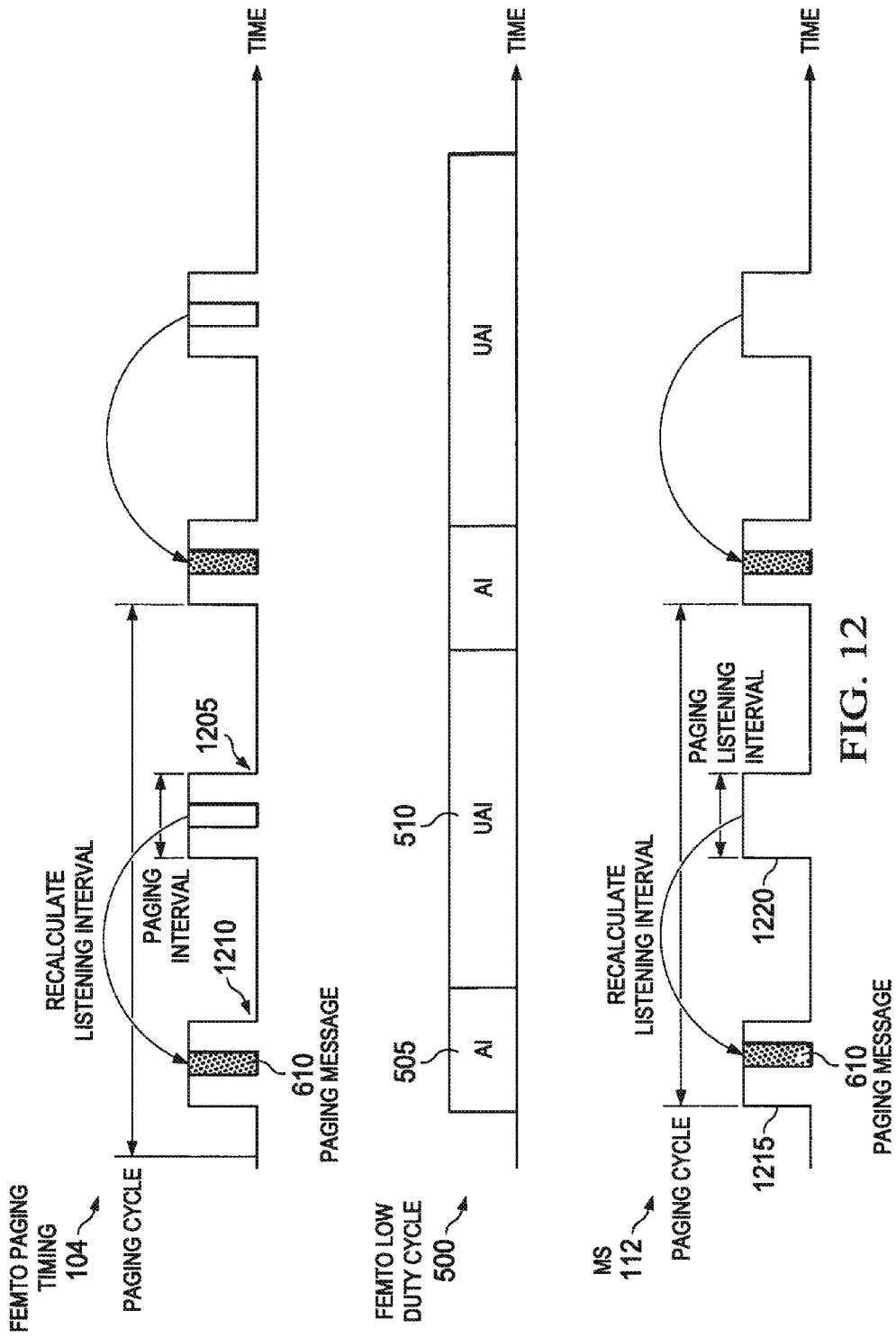
FIG. 12 illustrates paging/paging-listening interval timings changes according to the femtocells LDC pattern for a femtocell to page its member MS according to embodiments of the present disclosure.

FIG. 12 illustrates paging/paging-listening interval timings changes according to the femtocells LDC pattern for a femtocell to page its member MS according to embodiments of the present disclosure. The embodiment of the paging/paging-listening interval timings changes shown in FIG. 12 is for illustration only. Other embodiments could be used without departing from the scope of this disclosure.

The paging interval 1205 overlaps with the UAI 510. Therefore, FBS 104 recalculates a new paging interval offset with which a new paging interval 1210 will overlap with AI 505 as much as possible, to reduce the total transmission time of femto so as to reduce the interference to other BSs. In the example shown in FIG. 12, only one paging message is shown; however, multiple paging messages for different groups of MSs can be broadcasted in the paging interval 1210. In addition, MS 112 can recalculate the paging listening interval offset such that the paging listening interval 1215 overlaps with the AI 505 as much as possible. Therefore, instead of listening for the paging messages in the original paging listening interval 1220, which overlaps with in the UAI 510, MS 112 listens for the paging messages within the new paging listening interval 1215.

In some embodiments, FBS 104, operating in low duty cycle mode, can broadcast a paging message in the UAI 510. If the timing of a paging message for MS 112, when FBS 104 is in the regular mode, overlaps the UAI 510, then FBS 104 performs an exceptional transmission over the air in its UAI 510 to send a paging message to MS 112. Therefore, MS 112 does not need to change its paging listening interval or slot.

In some embodiments, when a paging message needs to be delivered by FBS 104, operating in low duty cycle mode, to MS 112, the network (or the paging controller) sends a message to the FBS 104 to wake up FBS 104. In response, FBS 104 exits the low duty cycle mode (that is, enters the regular mode) and delivers the paging message to MS 112.

In some embodiments, MS 112 is a member mobile station and in idle mode. FBS 104 is a CSG femto in LDC mode. When the paging controller has updated MS 112's location, and MS 112 is to be paged, all the femtos in the same CSG page MS 112. To avoid waking up all the femtos that are in LDC in the same CSG, MS paging listening timing is configured to occur within the available interval of femtocell LDC. If needed, a recalculation of the BS 102 paging timing and MS 112 paging listening timing using a predefined process similar to the embodiment disclosed herein above. In some embodiments, all the femtos in the same CSG go back to regular mode (that is, exit LDC mode) and page MS 112.

In some embodiments, the transmitting time of the femto is reduced. More particularly, embodiments of the present disclosure can reduce the total length of the AI 505 to further improve interference mitigation.

Figure 13:
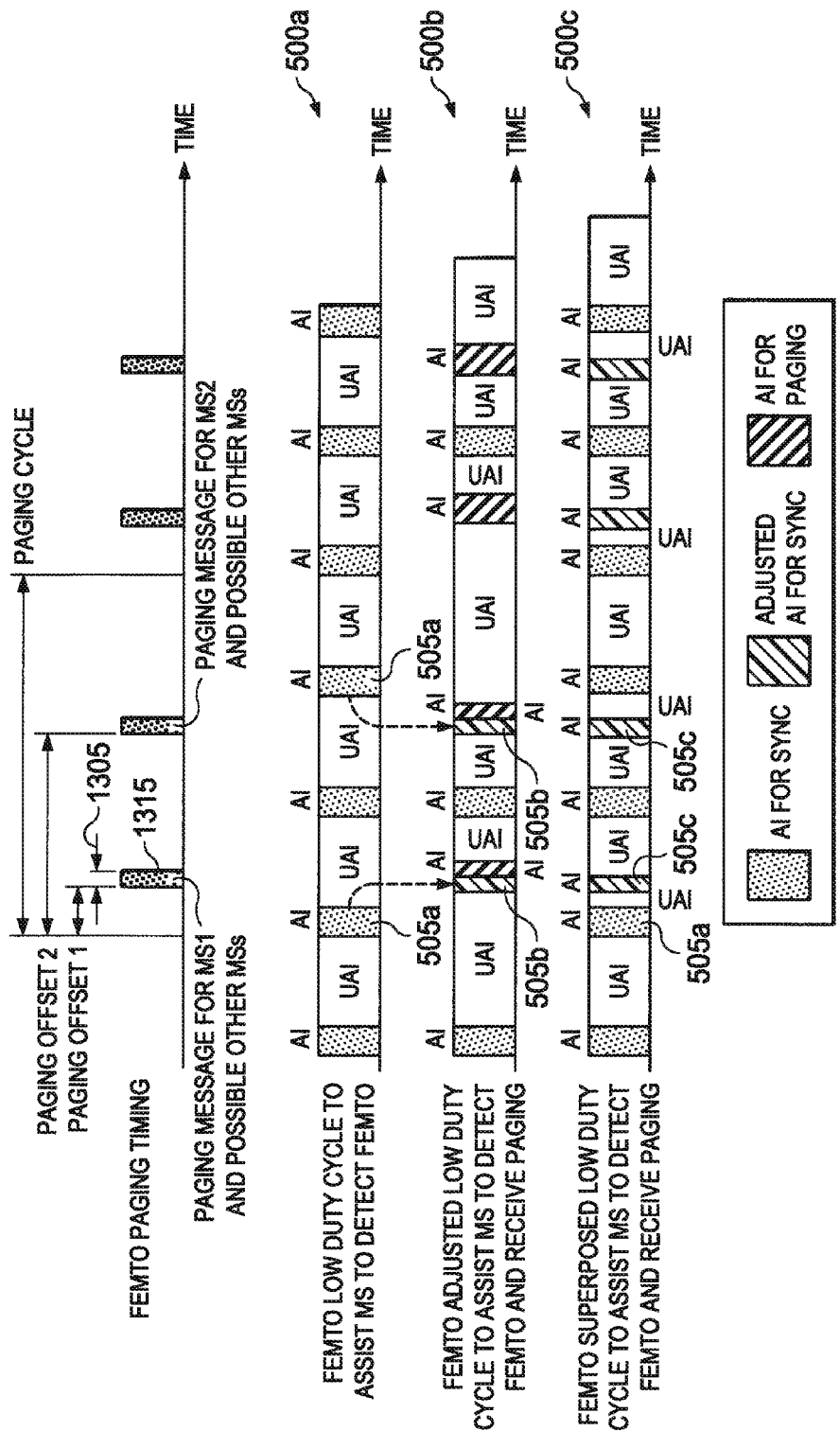
FIG. 13 illustrates coordinating available and paging intervals by adjusting the available interval start time according to embodiments of the present disclosure.

FIG. 13 illustrates coordinating available and paging intervals by adjusting the available interval start time according to embodiments of the present disclosure. The embodiment of the coordinating process shown in FIG. 13 is for illustration only. Other embodiments could be used without departing from the scope of this disclosure.

In the example shown in FIG. 13, FBS 104 is operating in LDC mode 500a and the AI 505a is longer than the paging interval slot 1305. If the start time of an AI 505a, which does not include the femto paging interval slot 1305, is within a certain distance from the femto paging interval slot 1305 start time, FES 104 changes the AI 505a start time using a predefined process. For example, FBS 104 adjusts the start time of 505a such that the paging interval slot 1305 overlaps with a synchronized AI 505b as shown in the LDC mode 500b. FBS 104 can adjust the start time of the newly positioned synchronized AI 505b forward (earlier) or backward (later). In one example, FBS 104 adds AI for paging 505c to the AI 505a such that the two AI's 505a, 505c occur as illustrated in the LDC mode 500c. The AI for paging 505c can be created such that it is substantially the same size as the femto paging interval slot 1305.

FBS 104 informs MS 112, in advance, the timing for the AI 505a and the paging intervals slot 1305. Thereafter, MS 112 uses the same process to determine how the AI 505a is moved.

In some embodiments, the predefined process can be based on a function as illustrated in Equation 6:

$$|PG\_OFFSET - AI\_OFFSET| \leq PARAMETER \qquad [\text{Eqn. 6}]$$

Therefore, if the distance of the FBS paging interval slot 1305 starting time (PG_OFFSET 1310) and an AI 505a starting time (AI_OFFSET) is less than a given parameter (PARAMETER), then FBS 104 will move the AI 505a to match the offset 1310 for the paging interval slot 1305, which matches the paging message 1315.

PG_OFFSET and AI_SC_OFFSET can be configured in units of a metric of the frame, such as, superframe, frame, subframe, and the like.

In the example shown in FIG. 13, 500b reduces transmission time of the femto as compared with 500c.

Figure 14:
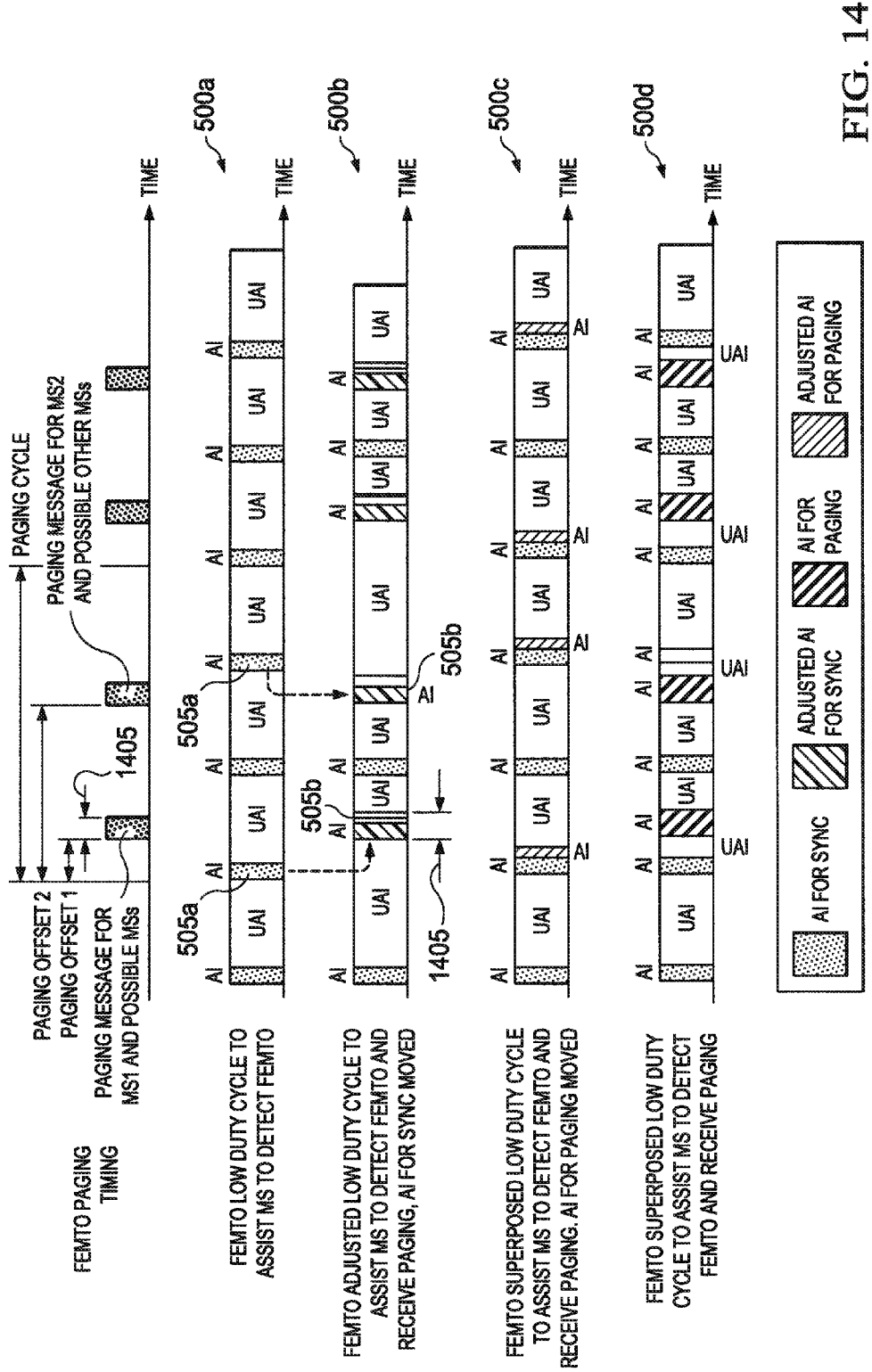
FIG. 14 illustrates coordinating available and paging intervals by adjusting the available interval start time and size according to embodiments of the present disclosure.

FIG. 14 illustrates coordinating available and paging intervals by adjusting the available interval start time and size according to embodiments of the present disclosure. The embodiment of the coordinating process shown in FIG. 14 is for illustration only. Other embodiments could be used without departing from the scope of this disclosure.

In the example shown in FIG. 14, the AI 505a does not include, i.e., overlap, the paging intervals 1405 of FBS 104, which is operating in LDC mode (LDM) 500. FBS 104 can extend the interval length of the AI 505*a* is the AI 505*a* interval length is smaller than the one of the paging interval slots 1405. The AI 505*a* interval length is extended so that the available interval 505*a* contains the paging interval slot 1405 of PBS 104.

The AI 505*a* that does not include the paging interval slot 1405 can be used for assisting MS 112 to scan femto in LDM, or it can be used for other purposes. Adjusting the size and start time of the AI 505*a* can reduce the total time for AI 505, so that the interference to other cells can be reduced.

If FBS 104 determines that AI 505*a* is shorter than the paging interval slot 1405, FBS 104 extends the size of the AI 505*a* to assist MS 112 to detect FBS 104. If necessary, FBS 104 can adjust the start time of AI 505 as illustrated in FIG. 13. Therefore, FBS 104 can adjust the start time such that the paging interval slot 1405 overlaps with a synchronized AI 505*b* as shown in the LDC mode 500*b*. FBS 104 can adjust the size of the newly positioned synchronized AI 505*b* to match the size of the paging interval slot 1405.

In some embodiments, the starting time of an AI 505 can be a pre-defined function of system information such as frequency allocation, paging group ID, types of femtos, and the like. MS 112 knows the pre-defined function and MS 112 can calculate the timing for AI 505 based on the received system information.

Figure 15:
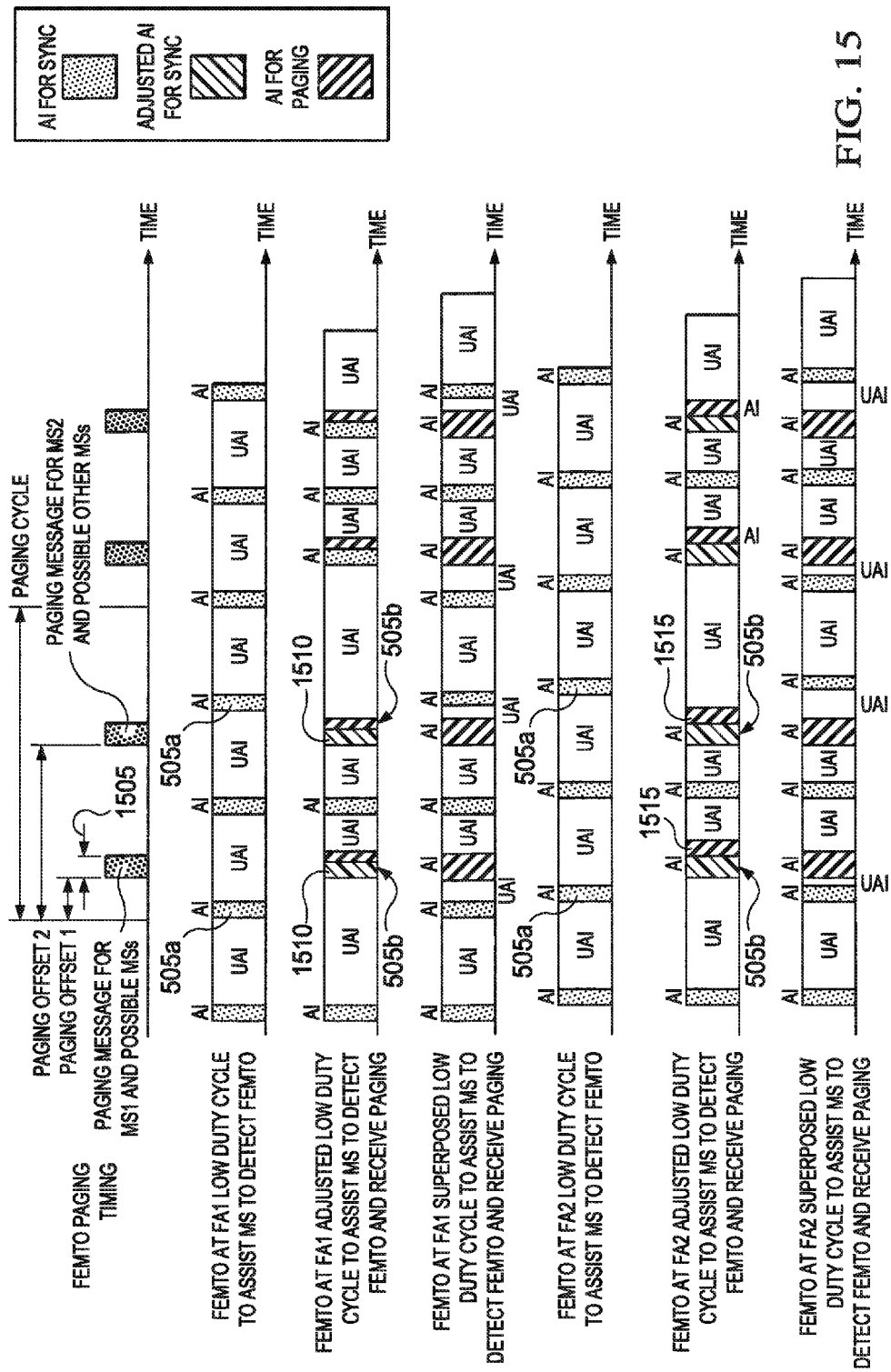
FIG. 15 another example for coordinating available and paging intervals by adjusting the available interval start time and size according to embodiments of the present disclosure.

FIG. 15 another example for coordinating available and paging intervals by adjusting the available interval start time and size according to embodiments of the present disclosure. The embodiment of the coordinating process shown in FIG. 15 is for illustration only. Other embodiments could be used without departing from the scope of this disclosure.

In the example shown in FIG. 15, the coordinating of the AI 505 and paging interval slot 1505 by adjusting the AI 505 starting time based on a frequency allocation is shown. FBS 104 coordinates the starting of the synchronized AI 505*b* to assist MS 112 to detect FBS 104 in LDM as a function of frequency allocation (FA) of the FBS 104. In this example, the frequency allocation and paging interval slot 1505, which may be decided by paging group ID, can be the inputs of the functions. The timing for the synchronized AI 505*b* to assist MS 112 to detect femto can be decided based on the FA. For example, for a first FA, a sync AI 1510 can be included in a first portion of the synchronized AI 505*b* and for a second FA, a sync AI 1515 can be included in a second portion of the synchronized AI 505*b*. Then to coordinate paging further, the processes defined in the embodiments above can be used.

In some embodiments, the change of the starting time of an AI 505 can be signaled to MS 112 by FBS 104.

In some embodiments, the time for AI 505 is shortened when there are multiple MSs in sleep mode.

Figure 16:
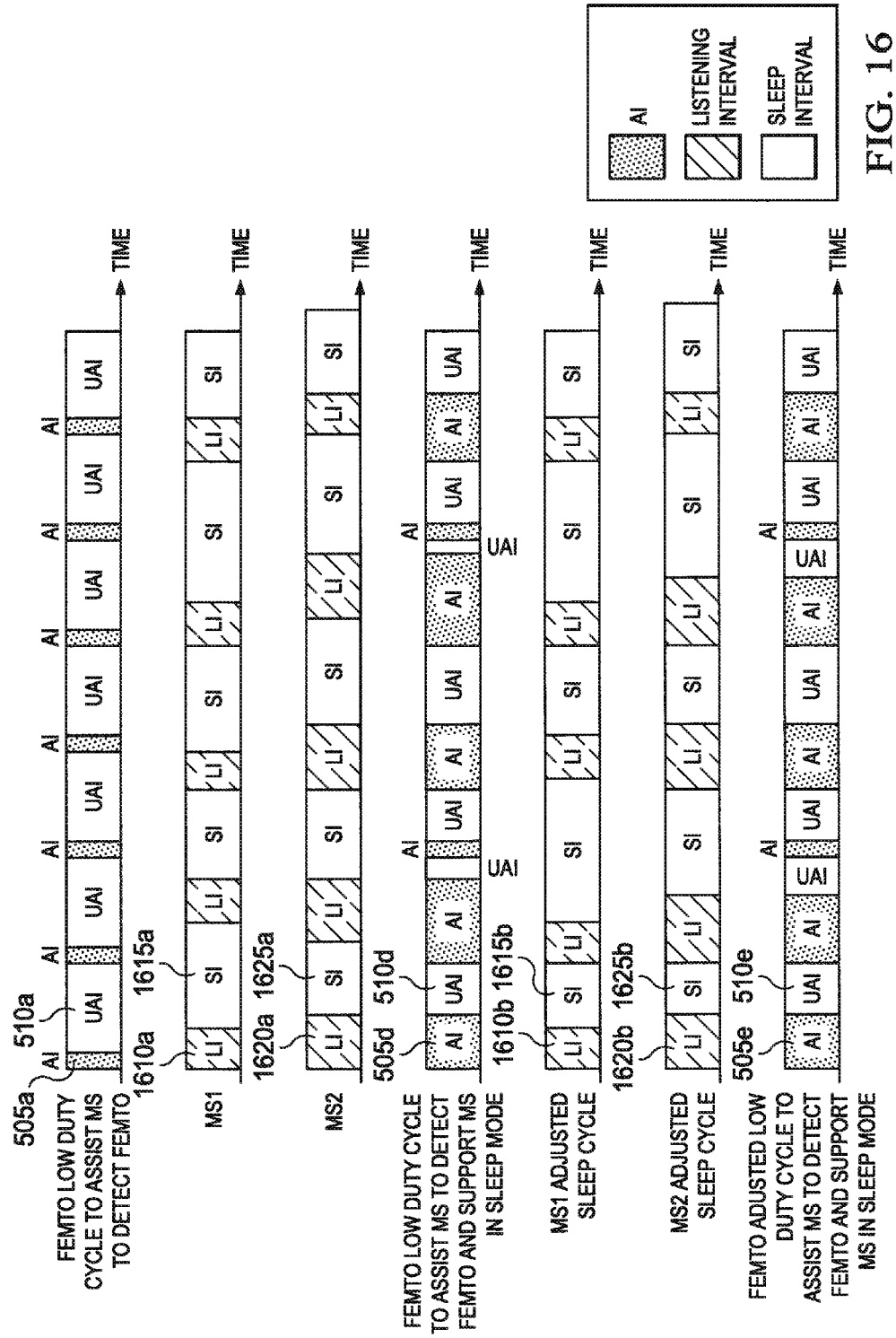
FIG. 16 illustrates coordinating of mobile station sleep cycles according to embodiments of the present disclosure.

FIG. 16 illustrates coordinating of mobile station sleep cycles according to embodiments of the present disclosure. The embodiment of the coordination shown in FIG. 16 is for illustration only. Other embodiments could be used without departing from the scope of this disclosure.

In some embodiments, FBS 104 coordinates the sleeping cycles for the mobile stations in sleep mode. In the example shown in FIG. 16, MS 112 includes listening intervals (LI) 1610*a* and sleep intervals (SI) 1615*a* and MS 115 includes LIs 1620*a* and SIs 1625*a*. FBS 104 can adjust and expand AI 505*a* to be the modified AI 505*d*. FBS 104 also can add an additional modified AI 505*d* as necessary. Modified AI 505*d* is configured to start at least as soon as the first LI 1610*a*, 1620*a* and last until at least the end of the last LI 1610*a*, 1620*a*. As a result, at least a portion of the SIs 1615*a*, 1625*a* overlap with the UAI 510. Therefore, FBS 104 can use as much as the resource available in the basic low duty 500 pattern to reduce the total time for available interval taking into account both the AI in basic low duty pattern and the AI to assist the mobile stations in sleep mode, that is the modified AI 505*d*.

In some embodiments, FBS 104 can signal the adjusted low duty cycle patterns to mobile stations.

In some embodiments, MS 112 and MS 115 coordinate the start times of their LIs. femto base station can follow predefined rules to adjust the low duty cycle patterns, and mobile stations will use the same predefined rules to know the pattern. The MSs can coordinate their sleep mode based on the rules and received signals about some other MSs sleep mode The predefined rules can be, for example, the starting time of the listening interval of an MS can be changed to be the nearest starting time of the AI which assists MS to detect femto, and the said listening interval shifts accordingly. Or the listening interval of an MS can be shifted in a minimum distance such that it will contain nearby AI which assists MS to detect femto.

For example, LI 1610*b* for MS 112 can start at substantially the same time as LI 1620*b* for MS 112. IN addition, FBS 104 can adjust and expand AI 505*a* to be the modified AI 505*e*. FBS 104 also can add an additional modified AI 505*e* as necessary. Modified AI 505*e* is configured to start as soon as the first LI 1610*a*, 1620*a* starts and last until the end of the last LI 1610*a*, 1620*a*. As a result, at least a portion of the SIs 1615*a*, 1625*a* overlap with the UAI 510. However, the modified AI 505*e* uses only those resources necessary to overlap with the LI's 1610*b*, 1620*b*.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a first base station capable of delivering a paging message, in a paging slot, to at least one of a plurality of mobile stations, the first base station configured to:
    determine if at least a portion of the paging slot overlaps with an available interval (AI) of a second base station in which the second base station transmits; and
    adjust an occurrence of the paging slot such that the paging slot at least one of overlaps and occurs within an unavailable interval (UAI) of the second base station, the UAI comprising a period in which the second base station transmits over limited resources or does not transmit.

2. The first base station as set forth in claim 1, wherein the base station adjusts the occurrence of the paging slot by recalculating the paging timing of the paging slot based on a function of the patterns of the occurrence of at least one of the AI and UAI of the second base station and at least one of:
    Mobile Station Identifiers (MSIDs);
    at least one sequence derived from MSIDs;
    base station identifiers;
    paging cycle;
    paging area identifiers; and
    base station paging group identifiers.

3. The first base station as set forth in claim 1, wherein a plurality of messages is sent by one of broadcasting, multicasting, unicasting, before the adjustment of the timing of the paging, wherein the messages include at least one of:
    information regarding a configuration of the timing of the adjusted paging slot of the first base station;
    other related information for the recalculation of the timing of the adjusted paging slot;

information regarding an occurrence of at least one of the AI and UAI of the second base station.

4. For use in a wireless communication network, a method for delivering a paging message, in a paging slot, to at least one of a plurality of mobile stations, the method comprising:
obtaining the patterns of the occurrence of at least one of:
an available interval (AI) of at least one base station in which the at least one base station transmits, and
an unavailable interval (UAI) of the at least one base station in which the at least one base station transmits over limited resources or does not transmit;
comparing the paging slot to the patterns of the occurrence of the at least one of the AI and UAI of the at least one base station;
determining if at least a portion of the paging slot overlaps with the AI of the at least one base station; and
adjusting an occurrence of the paging slot such that the paging slot at least one of overlaps and occurs within an UAI of the at least one base station.

5. The method as set forth in claim 4, adjusting comprises: adjusting the occurrence of the paging slot by recalculating a paging timing of the paging slot based on a function of the patterns of the occurrence of the at least one of the AI and the UAI of a second base station and at least one of:
Mobile Station Identifiers (MSIDs);
at least one sequence derived from MSIDs;
base station identifiers;
paging cycle;
paging area identifiers; and
base station paging group identifiers.

6. The method as set forth in claim 4, further comprising one of broadcasting, multicasting, and unicasting, a plurality of messages, before the adjustment of the timing of the paging, wherein the plurality of messages includes at least one of:
information regarding a configuration of the timing of the adjusted paging slot of the first base station;
other related information for the recalculation of the timing of the adjusted paging slot;
information regarding an occurrence of at least one of the AI and UAI of the second base station.

7. For use in a wireless communication network, a mobile station capable of receiving a paging message, the mobile station comprising:
a plurality of antennas configured to receive the paging message, in a paging listening slot, from a first base station;
a main processor coupled to the antennas, the main processor configured to determine if at least a portion of the paging listening slot overlaps with an available interval (AI) of a second base station in which the base station transmits and adjust an occurrence of the paging listening slot such that the paging listening slot at least one of overlaps and occurs within an unavailable interval (UAI) of the second base station in which the base station transmits over limited resources or does not transmit.

8. The mobile station as set forth in claim 7, wherein the main processor
adjusts the occurrence of the paging slot by recalculating the paging timing of the paging slot based on a function of the patterns of the occurrence of at least one of the AI and UAI of the second base station and at least one of:
Mobile Station Identifiers (MSIDs);
at least one sequence derived from MSIDs;
base-station identifiers;
paging cycle;
paging area identifiers; and
base station paging group identifiers.

9. For use in a wireless communication network, a method for receiving a paging message in a listening slot, the method comprising:
obtaining the patterns of the occurrence of at least one of:
an available interval (AI) of at least one base station in which the at least one base station transmits, and
an unavailable interval (UAI) of the at least one base station in which the at least one base station transmits over limited resources or does not transmit;
receiving paging slot information from a serving base station, the paging slot information configured to identify the occurrence of a paging slot such that the listening slot is calculated;
comparing the paging slot to the patterns of the occurrence of the at least one of the AI and UAI of the at least one base station;
determining if at least a portion of the paging slot overlaps with the AI of the at least one base station; and
adjusting an occurrence of the paging slot such that the paging slot at least one of overlaps and occurs within an UAI of the at least one base station.

10. The method as set forth in claim 9, wherein adjusting comprises: adjusting the occurrence of the paging slot by recalculating a paging timing of the paging slot based on a function of the patterns of the occurrence of the at least one of the AI and the UAI of a second base station and at least one of:
Mobile Station Identifiers (MSIDs);
at least one sequence derived from MSIDs;
base station identifiers;
paging cycle;
paging area identifiers; and
base station paging group identifiers.

11. For use in a wireless communication network, a base station capable of broadcasting a paging message, in a paging slot, to at least one of a plurality of mobile stations, the base station configured to:
operate in a low duty cycle (LDC) mode comprising an available interval (AI) and an unavailable interval (UAI), wherein the base station is configured to transmit and receive in the AI and is configured to at least one of not transmit and transmit with limited resources during the UAI;
determine if at least a portion of the paging slot overlaps with the UAI; and
adjust an occurrence of the paging slot such that the paging slot at least one of overlaps and occurs within the AI.

12. The base station as set forth in claim 11, wherein the base station at least one of:
adjusts by recalculating the timing offset of the paging slot and one or more of:
Mobile Station Identifiers (MSIDs);
paging cycle; and
required paging offsets.

13. The base station as set forth in claim 11,
wherein a plurality of messages is sent by one of broadcasting, multicasting, unicasting, before the adjustment of the timing of the paging, wherein the messages include at least one of:
information regarding a configuration of the timing of the adjusted paging slot of the first base station;
other related information for the recalculation of the timing of the adjusted paging slot;
information regarding an occurrence of at least one of the AI and UAI of the second base station.

14. For use in a wireless communication network, a method for broadcasting a paging message, in a paging slot, to at least one of a plurality of mobile stations, the method comprising:

operating a base station in a low duty cycle (LDC) mode comprising an available interval (AI) and an unavailable interval (UAI), wherein the base station is configured to transmit and receive in the AI and is configured to at least one of not transmit and transmit with limited resources during the UAI;

comparing the paging slot to a LDC mode pattern for the base station;

determining if at least a portion of the paging slot overlaps with the UAI; and adjusting an occurrence of the paging slot such that the paging slot at least one of overlaps and occurs within the AI.

15. The method as set forth in claim 14, wherein adjusting comprises computing a function based on a function of the LDC pattern and one or more of:

MSIDs;
paging cycle; and
required paging offsets.

16. The method as set forth in claim 14, further comprising one of broadcasting, multicasting, and unicasting, a plurality of messages, before the adjustment of the timing of the paging, wherein the plurality of messages include at least one of:

information regarding a configuration of the timing of the adjusted paging slot of the first base station;

other related information for the recalculation of the timing of the adjusted paging slot;

information regarding an occurrence of at least one of the AI and UAI of the second base station.

17. For use in a wireless communication network, a mobile station capable of receiving a paging message, the mobile station comprising:

a plurality of antennas configured to receive the paging message, in a paging listening slot, from a base station;

a main processor coupled to the antennas, the main processor configured to determine if at least a portion of the paging listening slot overlaps with an unavailable interval (UAI) of a low duty cycle (LDC) mode of a the base station and adjust an occurrence of the paging listening slot such that the paging listening slot at least one of overlaps and occurs within an available interval (AI) of the LDC mode.

18. The mobile station as set forth in claim 17, wherein the main processor adjust the timing of the listening, by recalculating relevant listening timing offsets based on a function of LDC patterns of the base station and one or more of:

Mobile Station Identifiers (MSIDs);
paging cycle; and
required paging offsets.

19. For use in a wireless communication network, a method for receiving a paging message in a listening slot, the method comprising:

obtaining a low duty cycle (LDC) mode pattern for a base station operating in an LDC mode, the LDC mode comprising an available interval (AI) and an unavailable interval (UAI), wherein the base station is configured to transmit and receive in the AI and is configured to at least one of not transmit and transmit with limited resources during the UAI;

determining if at least a portion of a paging slot overlaps with the UAI of the LDC mode; and recalculating an occurrence of the listening slot such that the listening slot at least one of overlaps and occurs within the AI of the LDC mode.

20. The method as set forth in claim 19, wherein recalculating further comprises adjusting the timing of the listening by recalculating relevant listening timing offsets based on a function of LDC patterns of the base station and one or more of:

Mobile Station Identifiers (MSIDs);
paging cycle; and
required paging offsets.

* * * * *